(12) United States Patent
Obayashi et al.

(10) Patent No.: US 12,058,289 B2
(45) Date of Patent: Aug. 6, 2024

(54) IMAGE FORMING APPARATUS TO VERIFY PRINTED IMAGE WITH MASTER IMAGE, IMAGE FORMING METHOD, AND STORAGE MEDIUM

(71) Applicant: CANON KABUSHIKI KAISHA, Tokyo (JP)

(72) Inventors: Yosuke Obayashi, Chiba (JP); Masanori Ichikawa, Kanagawa (JP); Minoru Kambegawa, Chiba (JP); Junichi Goda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/849,460

(22) Filed: Jun. 24, 2022

(65) Prior Publication Data

US 2022/0329701 A1    Oct. 13, 2022

Related U.S. Application Data

(63) Continuation of application No. 17/081,297, filed on Oct. 27, 2020, now Pat. No. 11,418,656.

(30) Foreign Application Priority Data

Oct. 28, 2019  (JP) .................................. 2019-195551

(51) Int. Cl.
*H04N 1/00* (2006.01)
*G06F 3/12* (2006.01)
*G06K 15/02* (2006.01)

(52) U.S. Cl.
CPC ..... *H04N 1/00045* (2013.01); *H04N 1/00005* (2013.01); *H04N 1/0009* (2013.01); *H04N 1/00092* (2013.01); *H04N 1/00411* (2013.01); *H04N 1/00037* (2013.01)

(58) Field of Classification Search
None
See application file for complete search history.

(56) References Cited

U.S. PATENT DOCUMENTS

| | | | | |
|---|---|---|---|---|
| 5,999,636 A | * | 12/1999 | Juang | G06V 10/993 250/559.08 |
| 11,418,656 B2 | * | 8/2022 | Obayashi | H04N 1/00411 |
| 11,455,129 B2 | * | 9/2022 | Yasaki | G06F 3/1256 |
| 2007/0201066 A1 | * | 8/2007 | Ziv | H04N 1/6033 358/475 |
| 2015/0243007 A1 | * | 8/2015 | Bless | G06T 7/001 382/112 |
| 2019/0238685 A1 | * | 8/2019 | Tsukamoto | H04N 1/00074 |

(Continued)

FOREIGN PATENT DOCUMENTS

| | | | | |
|---|---|---|---|---|
| JP | H09259323 | * | 10/1997 | ............. G07D 7/00 |
| JP | 2001053973 | * | 2/2001 | ............. H04N 1/40 |

(Continued)

*Primary Examiner* — Beniyam Menberu
(74) *Attorney, Agent, or Firm* — Canon U.S.A., Inc., IP Division

(57) ABSTRACT

An image printed on a recording sheet is read, and the read image is displayed on a display unit. An instruction to use the displayed image as a correct answer image is accepted, and an image generated from the image that the instruction to use is accepted is registered as the correct answer image. A printed image is verified by comparing the printed image with the registered correct answer image.

10 Claims, 20 Drawing Sheets

(56) References Cited

U.S. PATENT DOCUMENTS

2021/0033463 A1* 2/2021 Ichioka ................ G06K 15/027
2021/0035297 A1* 2/2021 Barbash .................... G06T 7/30

FOREIGN PATENT DOCUMENTS

| JP | 2005-271331 A | 10/2005 | |
| JP | 2009115565 | * 5/2009 | ........... G01N 21/892 |
| JP | 2010173289 A | 8/2010 | |
| JP | 2018-079581 A | 5/2018 | |
| JP | 2019041204 | * 3/2019 | ............. H04N 1/387 |
| JP | 2019-132966 A | 8/2019 | |

* cited by examiner

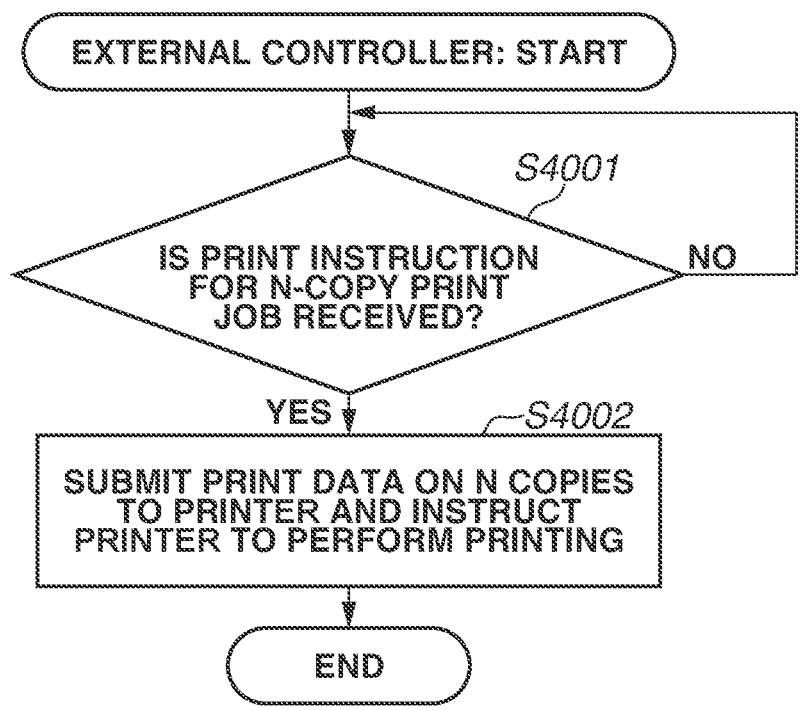
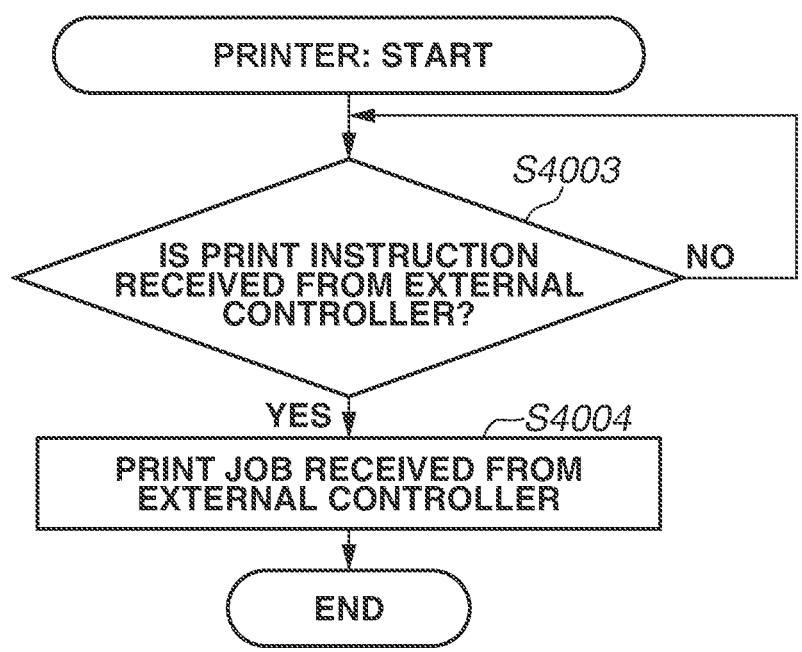

FIG.8

REGISTER CORRECT ANSWER IMAGES

NUMBER OF SHEETS PER COPY

| 1 | △▽ | ~801

SIDE(S) TO BE VERIFIED

| ☑ | BOTH SIDES | ~802
|   | FRONT ONLY |
|   | BACK ONLY  |

NUMBER OF CORRECT ANSWER
IMAGES TO BE OBTAINED

| 3 | △▽ | ~803

804

START TO REGISTER
CORRECT ANSWER IMAGES

FIG.17

REGISTER CORRECT ANSWER IMAGES

NUMBER OF SHEETS PER COPY

1 ~1701

SIDE(S) TO BE VERIFIED

☑ BOTH SIDES ~1702
☐ FRONT ONLY
☐ BACK ONLY

NUMBER OF CORRECT ANSWER IMAGES TO BE OBTAINED

3 ~1703

AUTOMATICALLY EXCLUDE FROM CANDIDATES

☑ READING STREAKS ~1705

1704
START TO REGISTER CORRECT ANSWER IMAGES

FIG.18

| READ IMAGE | DEFECT INFORMATION |
|---|---|
| PAGE 1 | 0 |
| PAGE 2 | 0 |
| PAGE 3 | 1 |
| PAGE 4 | 0 |
| PAGE 5 | 0 |

IMAGE FORMING APPARATUS TO VERIFY PRINTED IMAGE WITH MASTER IMAGE, IMAGE FORMING METHOD, AND STORAGE MEDIUM

CROSS-REFERENCE TO RELATED APPLICATION

This application is a Continuation of U.S. application Ser. No. 17/081,297, filed Oct. 27, 2020, which claims priority from Japanese Patent Application No. 2019-195551, filed Oct. 28, 2019, which are hereby incorporated by reference herein in their entireties.

BACKGROUND

Field

One disclosed aspect of the embodiments relates to an image forming apparatus with verification of printed image, an image forming method, and a storage medium.

Description of the Related Art

A printing system has been known in recent years that can verify a sheet printed by a printer with a verification apparatus during conveyance. To verify a printed sheet, the verification apparatus reads an image on the conveyed printed sheet and determines whether the printed sheet is normal based on image analysis of the read image. For example, the verification apparatus can detect an incomplete barcode or ruled line, a missing image, a printing failure, a missing page, and a color drift.

As a method for generating a correct answer image (master image or reference image) for image analysis, a method of reading a previously printed sheet having sufficient quality as a correct answer image by a verification apparatus and using the read printed sheet has been known. Obtaining the correct answer image by a read sensor of the verification apparatus to be used in an actual verification process can reduce verification errors due to the conveyance precision of printed sheets and the reading accuracy of the read sensor.

In obtaining a correct answer image, the printed sheet to be read may desirably be printed with sufficient quality as a correct answer image and correctly read by the read sensor. For example, streaks can occur on the read image because paper dust of the printed sheet adheres to the read sensor of the verification apparatus. If an image including a streak is used as a correct answer image, a printing failure can erroneously be detected even in the absence of a defect in a print product. Japanese Patent Application Laid-Open No. 2010-173289 discusses printing a correct answer image to be registered and a defect detection pattern on different sheets of paper and reading the defect detection pattern before registering an non-defective image as the correct answer image.

However, the foregoing streaks due to paper dust can occur during reading of the sheet with the correct answer image even if not during the reading of the sheet with the defect detection pattern. According to Japanese Patent Application Laid-Open No. 2010-173289, an image defect occurring in the read correct answer image can therefore fail to be detected. As a result, the image including the image defect can be registered as a correct answer image.

SUMMARY

According to an aspect of the disclosure, an image forming apparatus includes a printing unit, a reading unit, a display control unit, an acceptance unit, a registration unit, and a verification unit. The printing unit is configured to print an image on a recording sheet. The reading unit is configured to read the image printed on the recording sheet. The display control unit is configured to display the image read by the reading unit on a display unit. The acceptance unit is configured to accept an instruction to use the image displayed on the display unit by the display control unit as a correct answer image. The registration unit is configured to register the image that the instruction to use is accepted by the acceptance unit or an image generated from the image as the correct answer image. The verification unit is configured to verify an image printed by the printing unit by comparing the printed image with the correct answer image registered by the registration unit.

According to the disclosure, the image read by the reading unit is displayed on the display unit. The correct answer image to be used for verification processing can thus be observed before selection, whereby an image including an image failure can be prevented from being registered as the correct answer image.

Further features of the disclosure will become apparent from the following description of exemplary embodiments with reference to the attached drawings.

BRIEF DESCRIPTION OF THE DRAWINGS

FIG. 4A is a flowchart illustrating a procedure performed by an external controller in registering correct answer images according to the first exemplary embodiment.

FIG. 4B is a flowchart illustrating a procedure performed by a printer in registering correct answer images according to the first exemplary embodiment.

FIG. 8 illustrates an example of a display screen when the verification apparatus initiates registration of correct answer images according to the first exemplary embodiment.

FIG. 17 illustrates an example of a display screen when the verification apparatus initiates registration of correct answer images according to the second exemplary embodiment.

FIG. 18 illustrates an example of a table for managing defect information according to the second exemplary embodiment.

DESCRIPTION OF THE EMBODIMENTS

Exemplary embodiments of the present exemplary embodiment will be described below with reference to the drawings.

In the following description, an external controller may be referred to as an image processing controller, a digital front end (DFE), or a print server. An image forming apparatus may be referred to as a multifunction peripheral (MFP).

First Exemplary Embodiment

Figure 1:
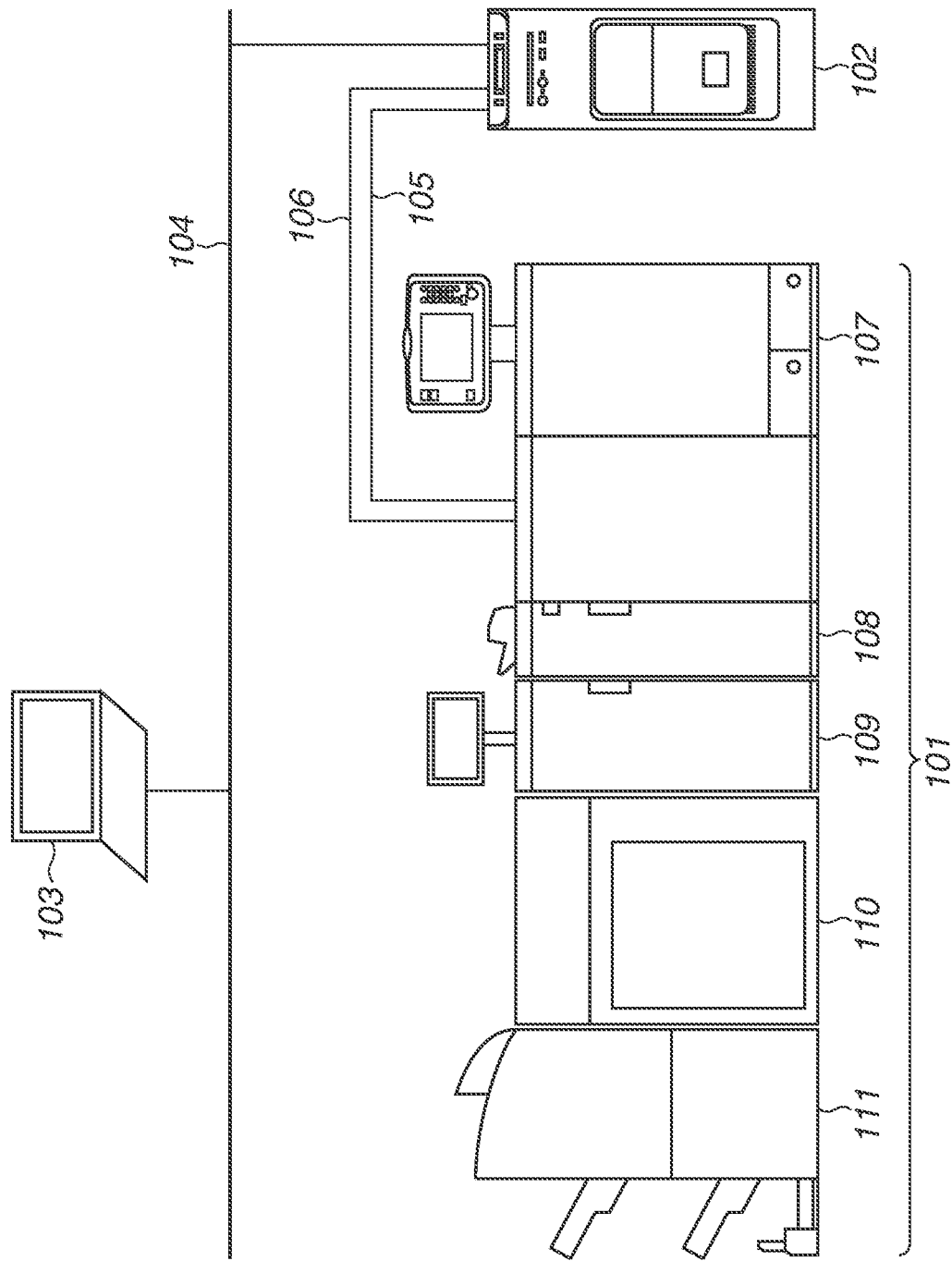
FIG. 1 is an overall view illustrating a hardware configuration of an image processing system according to a first exemplary embodiment.

FIG. 1 is an overall view illustrating a hardware configuration of an image processing system according to the present exemplary embodiment. The image processing system includes an image forming apparatus 101 and an external controller 102. The image forming apparatus 101 and the external controller 102 are communicably connected via an internal local area network (LAN) 105 and a video cable 106. The external controller 102 is communicably connected to a client personal computer (PC) 103 via an external LAN 104. The client PC 103 issues print instructions to the external controller 102.

A printer driving having a function of converting print data into a print description language processible by the external controller 102 is installed on the client PC 103. A user who performs printing can give print instructions from various applications via the printer driver. The printer driver transmits print data to the external controller 102 based on the print instructions from the user. Receiving the print instructions from the client PC 103, the external controller 102 performs data analysis and rasterization processing, and submits print data and issues print instructions to the image forming apparatus 101.

Next, the image forming apparatus 101 will be described. The image forming apparatus 101 includes a plurality of apparatuses having different functions. The apparatuses are connected and configured such that complicated print processing such as bookbinding can be performed.

A printer 107 forms an image with toner on a sheet conveyed from a sheet feed unit located in a lower part of the printer 107. A configuration and operation principle of the printer 107 will be described. A photosensitive drum is irradiated with scanning light that is obtained by reflecting a beam of light such as laser light, modulated based on image data, with a rotating polygonal mirror. An electrostatic latent image formed on the photosensitive drum by the laser light is developed with toner, and the resulting toner image is transferred to a sheet attached to a transfer drum. Such a series of image forming processes is performed with yellow (Y), magenta (M), cyan (C), and black (K) toners in succession, whereby a full color image is formed on the sheet. The sheet on the transfer drum on which the full color image is formed is conveyed to a fixing device. The fixing device includes a roller and a belt. The roller includes a heat source such as a halogen heater inside, and melts the toner on the toner image-transferred sheet and fixes the toner to the sheet by heat and pressure.

An inserter 108 is an apparatus for inserting insertion sheets. The inserter 108 can insert sheets into between given sheets in a group of sheets printed and conveyed by the printer 107.

A verification apparatus 109 is an apparatus for reading an image of the conveyed sheet and comparing the image with a correct answer image registered in advance to determine whether the printed image is normal.

A large capacity stacker 110 can stack a large volume of sheets. A finisher 111 applies finishing processing to the conveyed sheets. The finisher 111 can perform finishing processing such as stapling, punching, and saddle stitch bookbinding. The finisher 111 discharges the bookbinding products after the finishing processing to a discharge tray.

The inserter 108 and the verification apparatus 109 are not limited to the positions of FIG. 1 in order. The inserter 108 may be located between the verification apparatus 109 and the large capacity stacker 110.

The image processing system illustrated in FIG. 1 is configured such that the external controller 102 is connected to the image forming apparatus 101. However, the present exemplary embodiment is not limited to the configuration where the external controller 102 is connected. Specifically, the image forming apparatus 101 may be connected to the external LAN 104, and print data processible by the image forming apparatus 101 may be transmitted from the client PC 103 to the image forming apparatus 101. In such a configuration, the image forming apparatus 101 analyzes data and performs rasterization processing to perform print processing.

Figure 2:
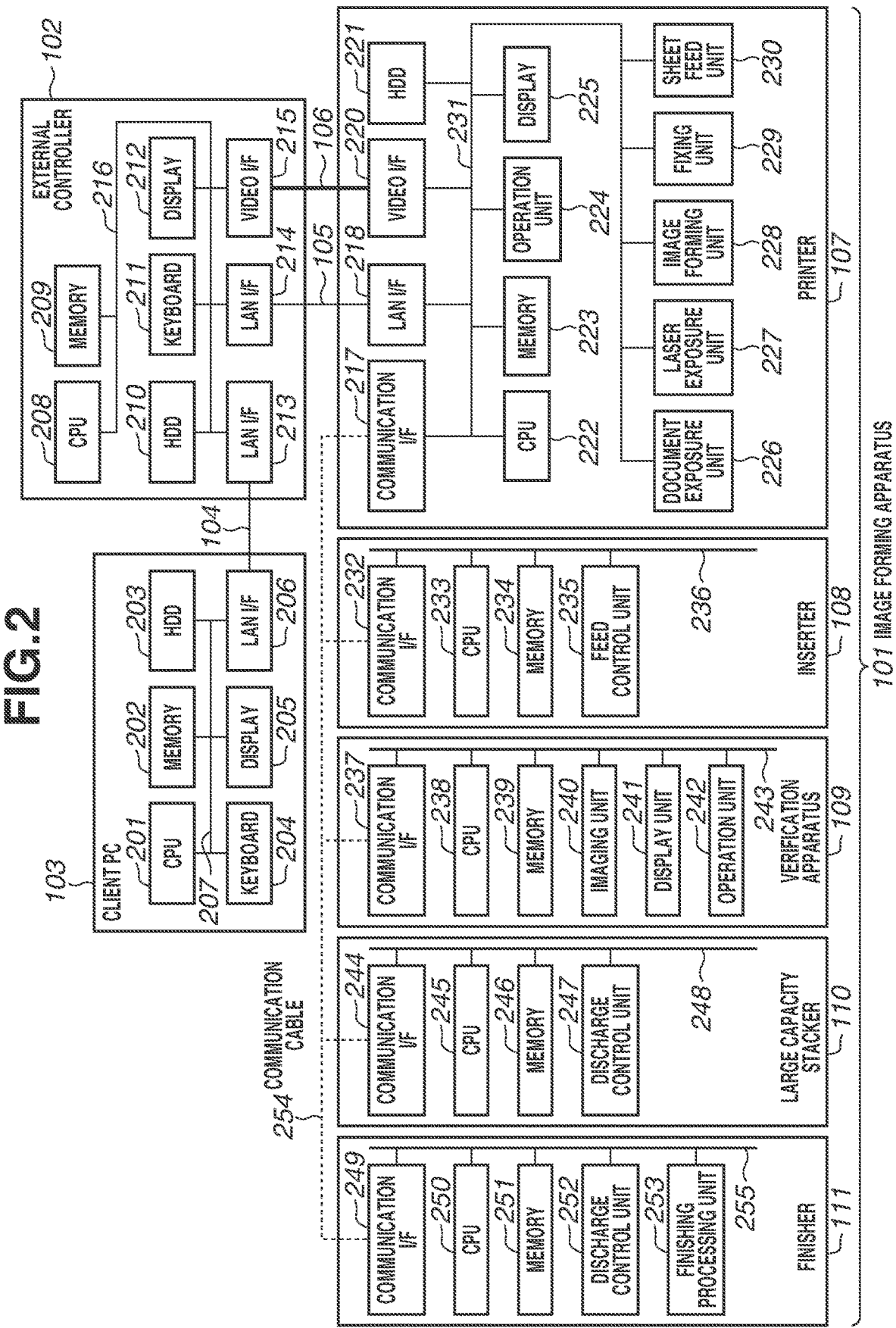
FIG. 2 is a block diagram illustrating a system configuration of the image processing system according to the first exemplary embodiment.

FIG. 2 is a block diagram illustrating a system configuration of the image forming apparatus 101, the external controller 102, and the client PC 103.

A configuration of the printer 107 of the image forming apparatus 101 will initially be described. The printer 107 of the image forming apparatus 101 includes a communication interface (I/F) 217, a LAN I/F 218, a video I/F 220, a hard disk drive (HDD) 211, a central processing unit (CPU) 222, a memory 223, an operation unit 224, and a display 225. The printer 107 of the image forming apparatus 101 further includes a document exposure unit 226, a laser exposure unit 227, an image forming unit 228, a fixing unit 229, and a sheet feed unit 230. Such components are connected via a system bus 231.

The communication I/F 217 is connected to the inserter 108, the verification apparatus 109, the large capacity stacker 110, and the finisher 111 via communication cables 254, and performs communication for controlling the apparatuses. The LAN I/F 218 is connected to the external controller 102 via the internal LAN 105, and communicates print data. The video I/F 220 is connected to the external controller 102 via the video cable 106, and communicates image data.

The HDD 221 is a storage device storing programs and data. The CPU 222 performs image processing control and print control based on the programs stored in the HDD 221. The memory 223 stores programs to be used when the CPU 222 performs various types of processing, as well as image data. The memory 223 operates as a work area. The operation unit 224 accepts various setting inputs and operation instructions from the user. The display 225 displays setting information about the image forming apparatus 101 and a processing status of print jobs.

The document exposure unit 226 performs processing for reading a document when a copy function or a scan function is used. The document exposure unit 226 reads document data by illuminating a sheet placed by the user with an exposure lamp and detecting an image with a complementary metal-oxide-semiconductor (CMOS) image sensor or a contact image sensor (CIS). The laser exposure unit 227 is a device that performs primary charging intended to irradiate the photosensitive drums with laser light to form toner images, as well as laser exposure. The laser exposure unit 227 initially performs primary charging to charge the surfaces of the photosensitive drums to a uniform negative potential. A laser driver then irradiates the photosensitive drums with laser light while the polygonal mirror adjusts reflection angles. Negative charges on the irradiated portions are thereby neutralized to form electrostatic latent images. The image forming unit 228 is a device for transferring toner to a sheet. The image forming unit 228 includes developing units, transfer units, and toner replenishment units, and transfers toner on the photosensitive drums to a sheet. The developing units make negatively-charged toner on developing cylinders adhere to the electrostatic latent images on the surfaces of the photosensitive drums to form visible images. The transfer units perform a primary transfer and a secondary transfer. In the primary transfer, a positive potential is applied to primary transfer rollers to transfer the toner on the surfaces of the photosensitive drums to a transfer belt. In the secondary transfer, a positive potential is applied to a secondary transfer outer roller to transfer the toner on the transfer belt to the sheet. The fixing unit 229 is a device for melting the toner on the sheet and fixing the melted toner to the sheet by heat and pressure. The fixing unit 229 includes a heater, a fixing belt, and a pressure belt. The sheet feed unit 230 is a device for feeding sheets. A sheet feed operation and conveyance operation are controlled by using rollers and various sensors.

Next, a configuration of the inserter 108 of the image forming apparatus 101 will be described. The inserter 108 of the image forming apparatus 101 includes a communication I/F 232, a CPU 233, a memory 234, and a feed control unit 235. Such components are connected via a system bus 236. The communication I/F 232 is connected to the printer 107 via a communication cable 254, and performs communication for control. The CPU 233 performs various controls for feeding sheets based on control programs stored in the memory 234. The memory 234 is a storage device storing the control programs. The feed control unit 235 controls rollers and sensors while controlling feeding and conveyance of sheets conveyed from a sheet feed unit of the inserter 108 and from the printer 107 based on instructions from the CPU 233.

Next, a configuration of the verification apparatus 109 of the image forming apparatus 101 will be described. The verification apparatus 109 of the image forming apparatus 101 includes a communication I/F 237, a CPU 238, a memory 239, an imaging unit 240, a display unit 241, and an operation unit 242. Such components are connected via a system bus 243. The communication unit I/F 237 is connected to the printer 107 via a communication cable 254, and performs communication for control. The CPU 238 performs various controls for verification based on control programs stored in the memory 239. The memory 239 is a storage device storing the control programs. The imaging unit 240 reads an image printed on a conveyed sheet with a CIS based on instructions from the CPU 238. The imaging unit 240 may obtain an image by capturing the image printed on the conveyed sheet with a camera. The imaging unit 240 reads not only print products to be verified but also a print product that serves as a correct answer image candidate in registering a correct answer image. A plurality of copies is printed for each page of the print product serving as a correct answer image candidate. Averages of the pixel values of pixels at corresponding positions on the plurality of printed pages are used as the pixel values of the correct answer image. If ten copies are printed, an average of the pixel values of pixels at corresponding positions on the ten pages (for example, the pixels at the top left corners of the images) is used as the pixel value of the correct answer image. This can reject minute variation components corresponding to a verification precision smaller than a verification precision in the print products as much as possible.

The CPU 238 compares an image captured by the imaging unit 240 with a correct answer image stored in the memory 239 (storage unit), and determines whether the printed image is normal. The display unit 241 displays verification results and setting screens. The operation unit 242 is operated by the user and accepts instructions for setting changes of the verification apparatus 109 and registration of a correct answer image.

Next, a configuration of the large capability stacker 110 of the image forming apparatus 101 will be described. The large capability stacker 110 of the image forming apparatus 101 includes a communication I/F 244, a CPU 245, a memory 246, and a discharge control unit 247. Such components are connected via a system bus 248. The communication I/F 244 is connected to the printer 107 via a communication cable 254, and performs communication for control. The CPU 245 performs various controls for sheet discharge based on control programs stored in the memory 246. The memory 246 is a storage device storing the control programs. The discharge control unit 247 controls conveyance of conveyed sheets to a stacking tray, an escape tray, or the subsequent finisher 111 based on instructions from the CPU 245.

Next, a configuration of the finisher 111 of the image forming apparatus 101 will be described. The finisher 111 of the image forming apparatus 101 includes a communication I/F 249, a CPU 250, a memory 251, a discharge control unit 252, and a finishing processing unit 253. Such components are connected via a system bus 255. The communication I/F 249 is connected to the printer 107 via a communication cable 254, and performs communication for control. The CPU 250 performs various controls for finishing and sheet discharge based on control programs stored in the memory 251. The memory 251 is a storage device storing the control programs. The discharge control unit 252 controls sheet conveyance and discharge based on instructions from the CPU 250. The finishing processing unit 253 controls finishing processing such as stapling, punching, and saddle stitch bookbinding based on instructions from the CPU 250.

Next, a configuration of the external controller 102 will be described. The external controller 102 includes a CPU 208, a memory 209, an HDD 210, a keyboard 211, a display 212, a LAN I/F 213, a LAN I/F 214, and a video I/F 215, which are connected via a system bus 216. The CPU 208 performs processing such as reception of print data from the client PC 103, raster image processor (RIP) processing, and transmission of print data to the image forming apparatus 101 based on programs and data stored in the HDD 210. The memory 209 stores programs and data to be used when the CPU 208 performs various types of processing, and operates as a work area. The HDD 210 stores programs and data to be used for operations such as print processing. The keyboard 211 is a device for inputting operation instructions to the external controller 102. The display 212 displays information about execution applications of the external controller 102 by using still and/or moving image video signals. The LAN I/F 213 is connected to the client PC 103 via the external LAN 104, and communicates print instructions. The LAN I/F 214 is connected to the image forming apparatus 101 via the internal LAN 105, and communicates print instructions. The video I/F 215 is connected to the image forming apparatus 101 via the video cable 106, and communicates image data.

Next, a configuration of the client PC 103 will be described. The client PC 103 includes a CPU 201, a memory 202, an HDD 203, a keyboard 204, a display 205, and a LAN I/F 206, which are connected via a system bus 207. The CPU 201 generates print data and executes print instructions based on a document processing program stored in the HDD 203. The CPU 201 also controls the devices connected to the system bus 207 in a comprehensive manner. The memory 202 stores programs and data to be used when the CPU 201 performs various types of processing, and operates as a work area. The HDD 203 stores programs and data to be used for print processing operations. The keyboard 204 is a device for inputting operation instructions to the client PC 103. The display 205 displays information about execution applications of the client PC 103 by using still and/or moving image video signals. The LAN I/F 206 is connected to the external LAN 104, and communicates print instructions.

In the foregoing description, the external controller 102 and the image forming apparatus 101 are connected with the internal LAN 105 and the video cable 106. However, the external controller 102 and the image forming apparatus 101 may have any configuration as long as the data to be used for printing can be transmitted and received. For example, the external controller 102 and the image forming apparatus 101 may be configured to be connected with only the video cable 106. Moreover, the memories 202, 209, 223, 234, 239, 249, and 251 each may be any storage device for storing data and programs. For examples, the memories 202, 209, 223, 234, 239, 249, and 251 may be replaced with volatile random access memories (RAMs), nonvolatile read-only memories (ROMs), built-in HDDs, external HDDs, and/or Universal Serial Bus (USB) memories.

Figure 3:
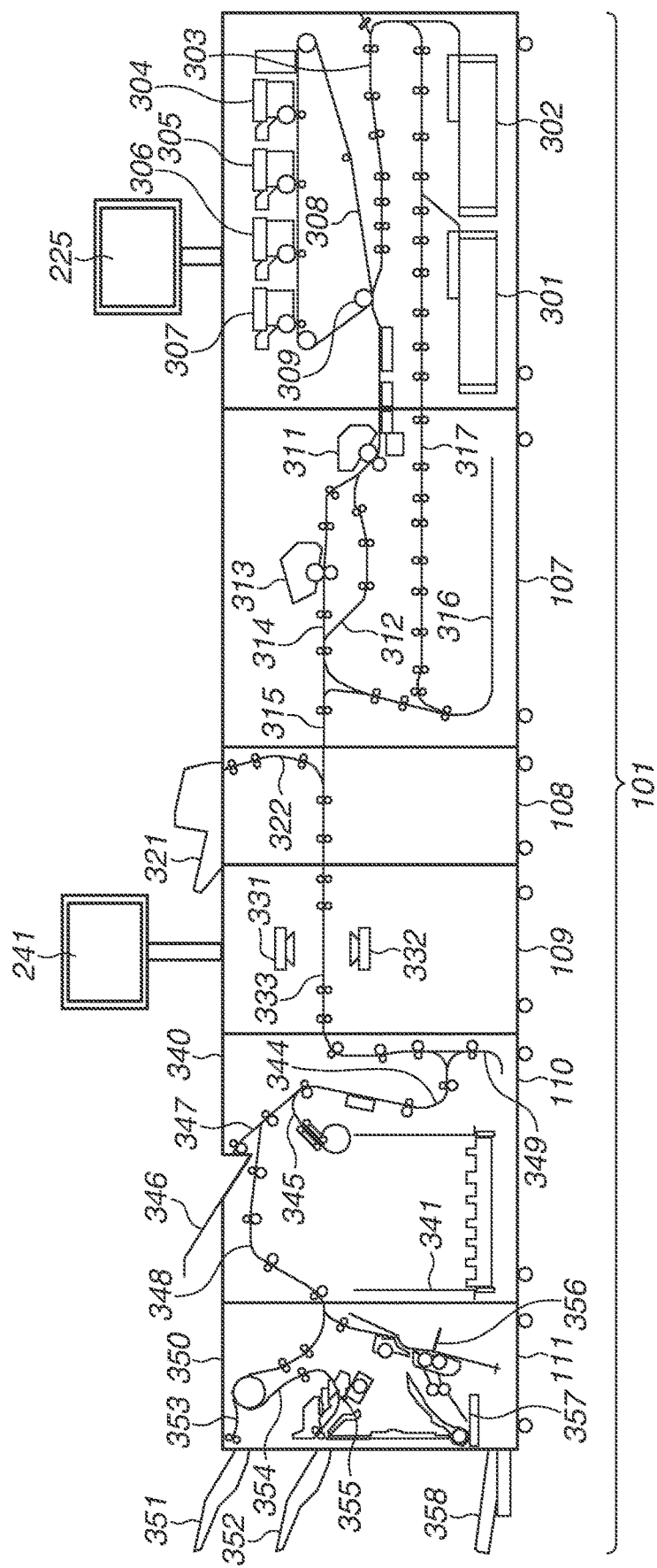
FIG. 3 is a schematic diagram illustrating a mechanical sectional view of an image forming apparatus according to the first exemplary embodiment.

FIG. 3 is a mechanical sectional view of the image forming apparatus 101. The printer 107 is an apparatus that forms an image to be printed on a sheet. Sheet feed decks 301 and 302 can accommodate various sheets. Each feed deck can separate only the topmost one of the accommodated sheets, and convey the sheet to a sheet conveyance path 303. To form a color image, developing stations 304, 305, 306, and 307 form toner images by using Y, M, C, and K color toners, respectively. The toner images formed here are primarily transferred to an intermediate transfer belt 308. The intermediate transfer belt 308 rotates clockwise, and the toner images are transferred to the sheet conveyed from the sheet conveyance path 303 at a secondary transfer position 309. The display 225 displays the printing status of the image forming apparatus 101 and information for making settings. A fixing unit 311 for fixing the toner images to the sheet includes a pressure roller and a heating roller. The toner melts and is pressurized when the sheet between the rollers passes d, whereby the toner images are fixed to the sheet. The sheet having passed through the fixing unit 311 is conveyed to a conveyance path 315 through a sheet conveyance path 312. Depending on the sheet type, additional melting and pressurization may be desirable for the sake of fixing. In such a case, the sheet having passed through the fixing unit 311 is conveyed to a second fixing unit 313 through an upper sheet conveyance path. After the application of the additional melting and pressurization, the sheet is conveyed to the conveyance path 315 through a sheet conveyance path 314. If the image forming mode is a two-sided mode, the sheet is conveyed to a sheet reversing path 316. The sheet is reversed by the sheet reversing path 316 and then conveyed to a two-sided conveyance path 317, and an image transfer is performed on the second side at the secondary transfer position 309.

The inserter 108 for inserting insertion sheets incudes an insertion tray 321, and merges sheets supplied through a sheet conveyance path 322 into the conveyance path. Sheets can thereby be inserted into a series of sheets conveyed from the printer 107 at given positions and conveyed to the subsequent apparatus.

The sheet having passed through the inserter 108 is conveyed to the verification apparatus 109. The verification apparatus 109 includes CISs 331 and 332 (reading units) that are opposed to each other. The CIS 331 is a sensor for reading the upper surface of the sheet (hereinafter, may be referred to as recording sheet). The CIS 332 is a sensor for reading the lower surface of the recording sheet. The image sensors for reading the sheet surfaces may be line scan cameras instead of CISs. The verification apparatus 109 reads images on both sides of the recording sheet with the CISs 331 and 332 at timing when the sheet conveyed to a sheet conveyance path 333 reaches a predetermined position, and determines whether the images are normal. The display unit 241 displays the result of the verification made by the verification apparatus 109.

The large capacity stacker 110 can stack a large volume of sheets. The large capacity stacker 110 includes a stacking tray 341 as a tray for stacking sheets. The sheet having passed through the verification apparatus 109 is input to the large capacity stacker 110 through a sheet conveyance path 344. The sheet is conveyed from the sheet conveyance path 344 through a sheet conveyance path 345 and stacked on the stacking tray 341. The large capacity stacker 110 further includes an escape tray 346 as a discharge tray. The escape tray 346 is a discharge tray used to discharge sheets determined to be defective sheets by the verification apparatus 109. In case where a sheet is output to the escape tray 346, the sheet is conveyed from the sheet conveyance path 344 to the escape tray 346 via a sheet conveyance path 347. In a case where a sheet is conveyed to a postprocessing apparatus at a stage subsequent to the large capacity stacker 110, the sheet is conveyed through a sheet conveyance path 348. A reversing portion 349 is intended to reverse a sheet. The reversing portion 349 is used in stacking a sheet on the stacking tray 341. In a case where a sheet is stacked on the stacking tray 341, the sheet is once reversed by the reversing portion 349 so that the input orientation and output orientation of the sheet are the same. In a case where a sheet is conveyed to the escape tray 346 or the postprocessing apparatus at the subsequent stage, the reversing operation by the reversing portion 349 is not performed, so that the sheet is simply discharged without flipping for stacking.

The finisher 111 applies finishing processing to conveyed sheets based on a function specified by the user. Specifically, the finisher 111 has finishing functions such as stapling (single stapling and double stapling), punching (two- and three-hole punching), and saddle stitch bookbinding. The finisher 111 includes two discharge trays 351 and 352. Sheets are output to the discharge tray 351 through a sheet conveyance path 353. The sheet conveyance path 353 is not capable of stapling or other finishing processing. To performing finishing processing such as stapling, sheets are conveyed through a sheet conveyance path 354 to a processing unit 355, where the finishing function specified by the user is performed, and the resulting sheets are output to the discharge tray 352. Both the discharge trays 351 and 352 can be moved up and down. The discharge tray 351 can be lowered so that sheets given the finishing processing by the processing unit 355 are stacked on the discharge tray 351. If saddle stitch bookbinding is specified, a saddle stitch processing unit 356 applies stapling processing to the center of the sheets. The sheets are then folded in half and output to a saddle stitch bookbinding tray 358 through a sheet conveyance path 357. The saddle stitch bookbinding tray 358 is configured as a belt conveyor. Bundles bound by the saddle stitch bookbinding are stacked on the saddle stitch bookbinding tray 358 and conveyed to the left.

The verification apparatus 109 verifies a sheet image printed by the printer 107 based on verification items set in advance. The sheet image is verified by comparing the printed sheet image with a correct answer image set in advance. Examples of the method for comparing the images include comparing pixel values at each image position, comparing object positions through edge detection, and extracting character data through optical character recognition (OCR). Examples of the verification items include a misalignment in print position, image color, image density, streaks, blur, and omission.

A procedure of processing for registering a correct answer image and an image verification processing procedure will be described below with reference to FIGS. 4A to 6.

FIG. 4A is a flowchart illustrating a procedure performed by the external controller 102 in registering a correct answer image. A program for performing the flowchart of FIG. 4A is stored in the HDD 210, read into the memory 209, and executed by the CPU 208.

In step S4001, the external controller 102 determines whether a print instruction for an N-copy print job is received. If, in step S4001, a print instruction for an N-copy print job is received (YES in step S4001), the processing proceeds to step S4002. In step S4002, the external controller 102 submits print data on N copies to the printer 107 and instructs the printer 107 to perform printing.

FIG. 4B is a flowchart illustrating a procedure performed by the printer 107 in registering a correct answer image. A program for performing the flowchart of FIG. 4B is stored in the HDD 221, read into the memory 223, and executed by the CPU 222.

In step S4003, the printer 107 waits until a print instruction is received from the external controller 102. If, in step S4003, a print instruction is received from the external controller 102 (YES in step S4003), the processing proceeds to step S4004. In step S4004, the printer 107 prints a job received from the external controller 102. Aside from image data, the job received from the external controller 102 includes information about a sheet feed source and a discharge destination. The printer 107 controls the inserter 108, the verification apparatus 109, the large capacity stacker 110, and the finisher 111 via the communication cables 254 based on the contents of the job received from the external controller 102.

Figure 5:
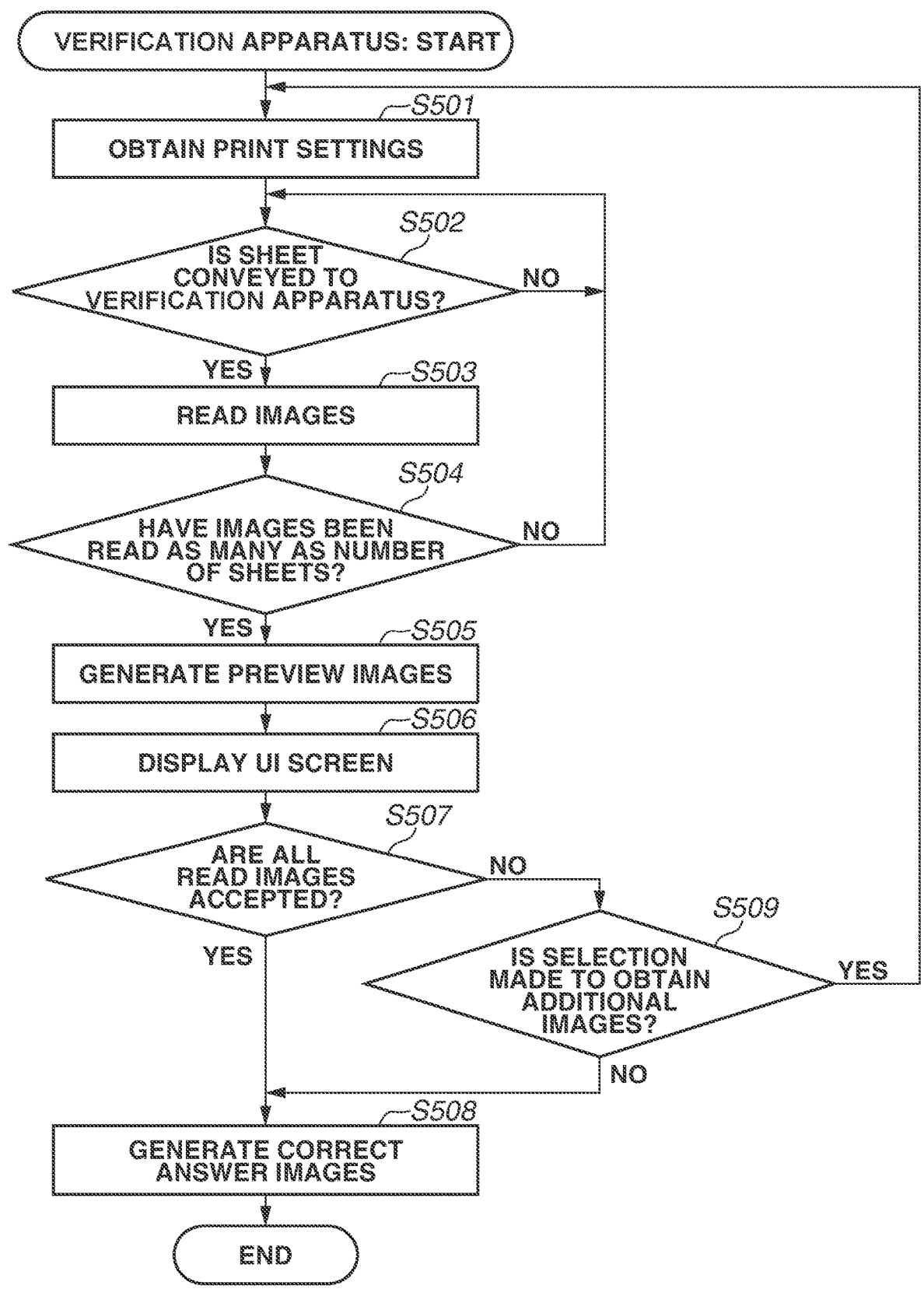
FIG. 5 is a flowchart illustrating a procedure performed by a verification apparatus in registering correct answer images according to the first exemplary embodiment.

FIG. 5 is a flowchart illustrating a procedure performed by the verification apparatus 109 in registering a correct answer image. A program for performing the flowchart of FIG. 5 is stored in the memory 239 and executed by the CPU 238 of the verification apparatus 109.

In step S501, the verification apparatus 109 obtains print settings (setting values). The setting values obtained in step S501 include the number of sheets per copy, the side(s) to be verified, and the number of images per sheet to average the pixel values in generating a correct answer image. In step S502, the verification apparatus 109 waits until a sheet is conveyed to the verification apparatus 109. If a sheet is conveyed in step S502 (YES in step S502), the processing proceeds to step S503. In step S503, the verification apparatus 109 reads images on the sheet by using the CISs 331 and 332, and stores the images in the memory 239 of the verification apparatus 109. In step S504, the verification apparatus 109 determines whether images have been read as many as the number of sheets obtained in step S501. If, in step S504, images have not been read as many as the number of sheets yet (NO in step S504), the processing proceeds to step S502. If images have been read as many as the number of sheets (YES in step S504), the processing proceeds to step S505.

In step S505, the verification apparatus 109 generates preview images for providing a preview display of the images read in step S503 on the display unit 241 of the verification apparatus 109. In step S506, the verification apparatus 109 performs display control to display the preview images on the display unit 241 along with a user interface (UI) screen. Details of the UI screen displayed here will be described below with reference to FIG. 10. In step S507, the verification apparatus 109 determines whether all the read images are accepted for use as correct answer images on the UI screen. If all the read images are accepted (YES in step S507), the processing proceeds to step S508. In step S508, the verification apparatus 109 generates correct answer images by averaging the pixel values of pixels located at corresponding positions on the plurality of printed pages. The processing ends.

If, in step S507, some of the read images are not accepted for use as correct answer images (NO in step S507), the processing proceeds to step S509. In step S509, the verification apparatus 109 determines whether a selection is made to obtain additional images on the UI screen. If the selection to obtain additional images is made (YES in step S509), the processing proceeds to step S501. If not (NO in step S509), the processing proceeds to step S508. The display of the UI screen in step S509 will be described below with reference to FIGS. 11A and 11B.

Figure 6:
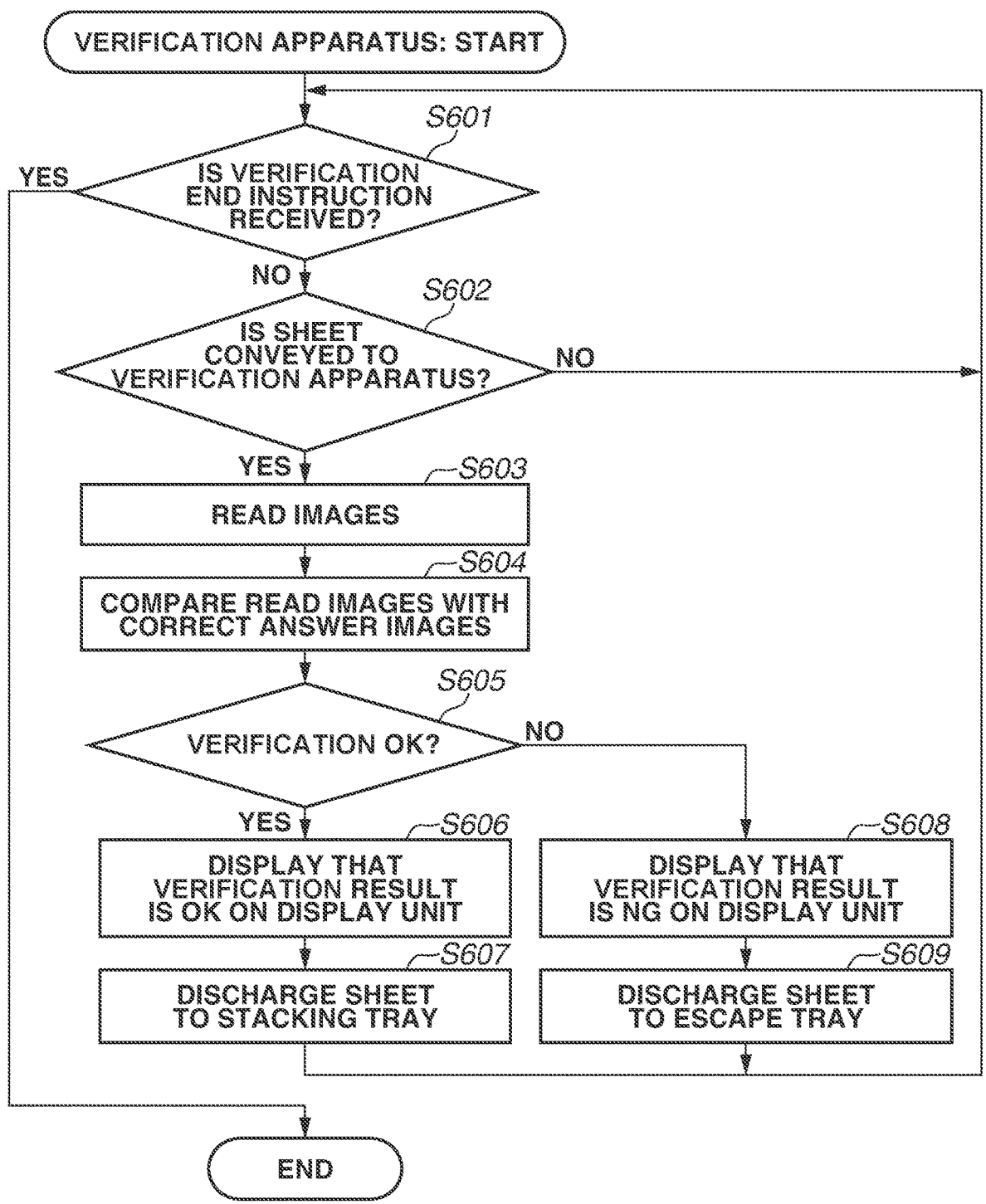
FIG. 6 is a flowchart illustrating a procedure performed by the verification apparatus in performing verification processing according to the first exemplary embodiment.

FIG. 6 is a flowchart illustrating a procedure performed by the verification apparatus 109 in performing verification processing. A program for performing the flowchart of FIG. 6 is stored in the memory 239 and executed by the CPU 238 of the verification apparatus 109.

Figure 13:
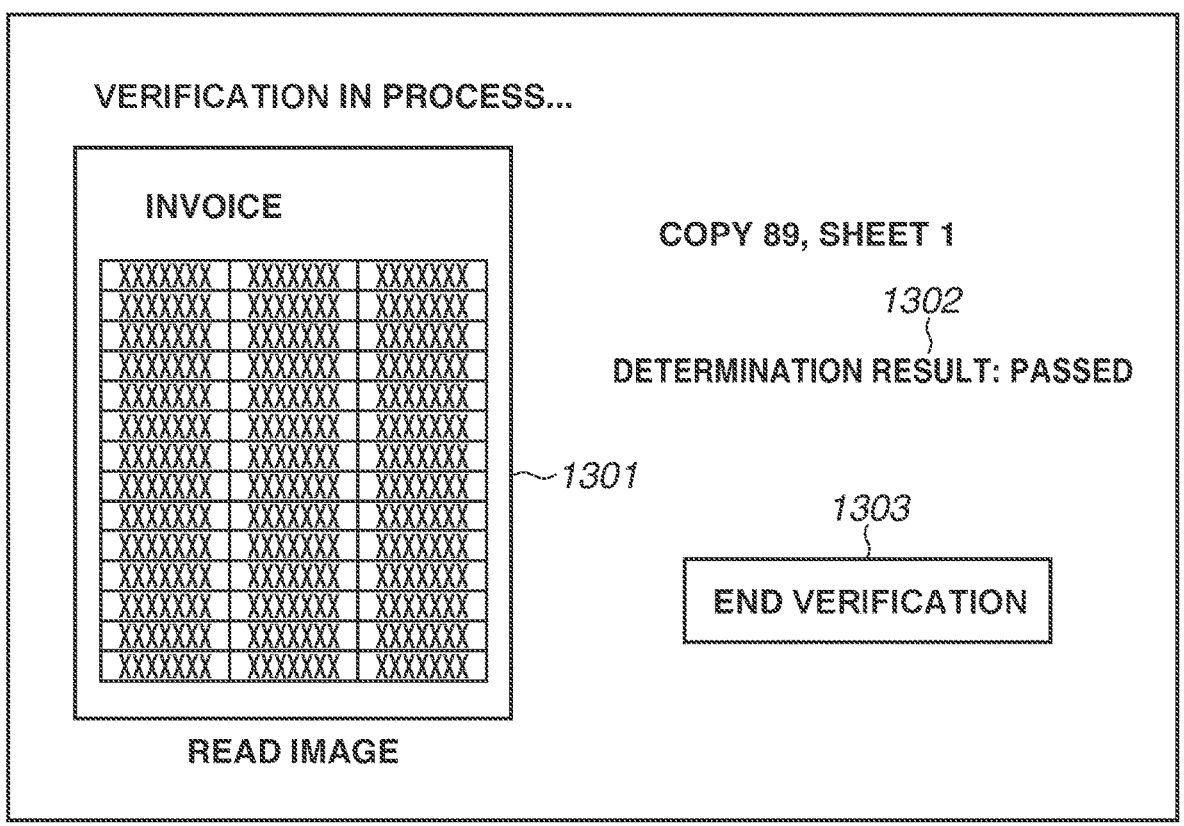
FIG. 13 illustrates an example of a display screen when the verification apparatus makes a determination of verification success according to the first exemplary embodiment.

In step S601, the verification apparatus 109 determines whether a verification end instruction is received. If a verification end button 1303 in FIG. 13 is selected, the determination of step S601 is YES. If, in step S601, the verification end instruction is received (YES in step S601), the processing of the verification apparatus 109 ends. If, step S601, no verification end instruction is received (NO in step S601), the processing proceeds to step S602.

In step S602, the verification apparatus 109 determines whether a sheet is conveyed to the verification apparatus 109. If no sheet is conveyed in step S602 (NO in step S602), the processing proceeds to step S601. If, in step S602, a sheet is determined to be conveyed (YES in step S602), the processing proceeds to step S603. In step S603, the verification apparatus 109 reads images on the sheet by using the CISs 331 and 332 and stores the read images in the memory 239 of the verification apparatus 109. The images stored here are displayed in a display section 1301 of FIG. 13.

In step S604, the verification apparatus 109 compares the images read in step S603 with the correct answer images. The correct answer images are based on settings registered in the verification apparatus 109 by using a button 703 of FIG. 7. The items to be compared in step S604 include a verification level set in a setting section 1201 of FIG. 12 and a verification type set in a setting section 1202 in FIG. 12. In step S605, the verification apparatus 109 determines whether the read images are normal images or defective images based on the result of the comparison made with the correct answer images in step S604. In the processing of step S605, the verification apparatus 109 determines whether the read images have image quality satisfying that of the correct answer images.

If, in step S605, the read images are determined to be normal images (verification success) (YES in step S605), the processing proceeds to step S606. In step S606, the verification apparatus 109 displays that the verification result is "passed" on the display unit 241 of the verification apparatus 109. FIG. 13 illustrates an example of the screen displayed in step S606.

In step S607, the verification apparatus 109 instructs the printer 107 to discharge the printed sheet to the stacking tray 341 of the large capacity stacker 110. The discharge destination to which the sheet is discharged here is the discharge destination set in a setting section 1503 in FIG. 15. Based on the instruction from the verification apparatus 109, the printer 107 instructs the large capacity stacker 110 to discharge the sheet to the stacking tray 341. The processing proceeds to step S601 to continue.

Figure 14:
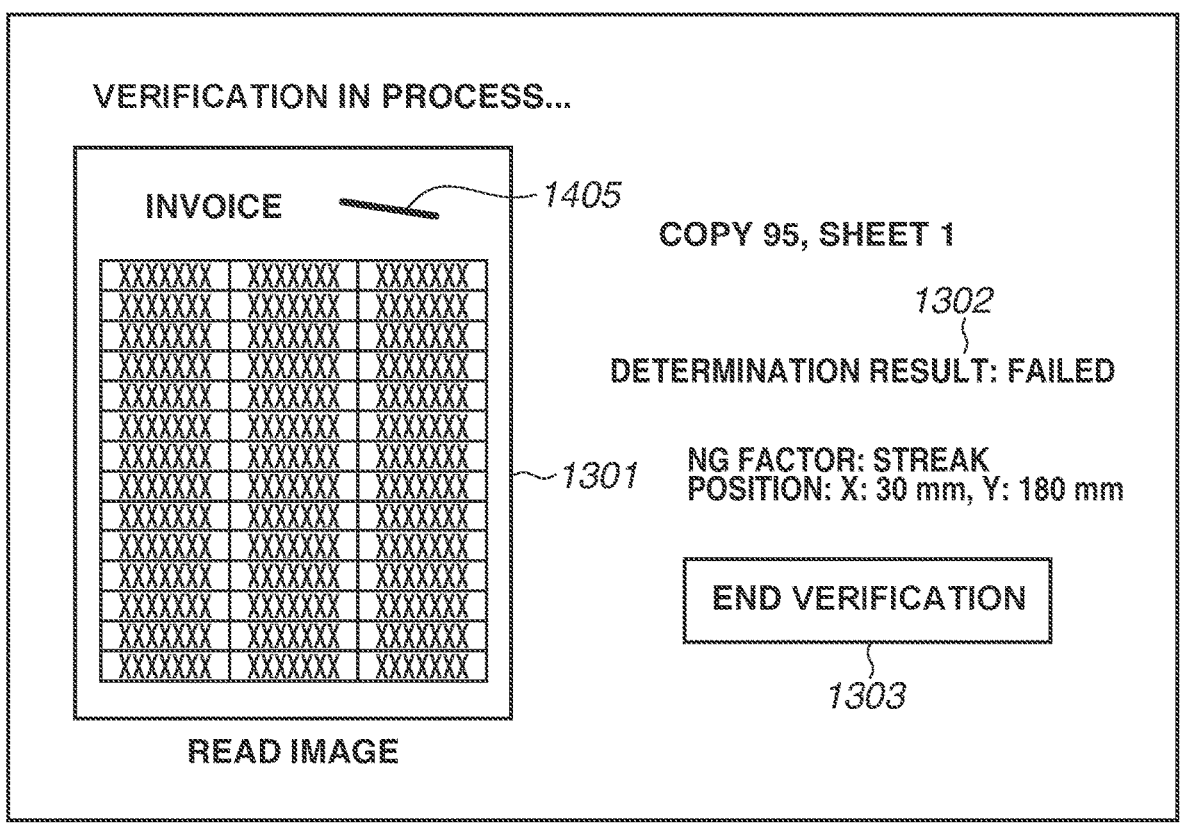
FIG. 14 illustrates an example of a display screen when the verification apparatus makes a determination of verification failure according to the first exemplary embodiment.

In step S605, if at least either one of the read images is determined to be a defective image (verification failure) (NO in step S605), the processing proceeds to step S608. In step S608, the verification apparatus 109 displays that the verification result is "failed" on the display unit 241 of the verification apparatus 109. FIG. 14 illustrates an example of the screen displayed in step S608. In step S609, the verification apparatus 109 instructs the printer 107 to discharge the printed sheet to the escape tray 346 of the large capacity stacker 110. The discharge destination to which the sheet is discharged here is the discharge destination in the case of verification failure, set in the setting section 1503 in FIG. 15. Based on the instruction from the verification apparatus 109, the printer 107 instructs the large capacity stacker 110 to discharge the sheet to the escape tray 346. The processing proceeds to step S601 to continue.

FIGS. 7 to 15 illustrate examples of display screens (UI screens) displayed on the display unit 241 of the verification apparatus 109. The display screens are displayed based on instructions from the CPU 238 of the verification apparatus 109.

Figure 7:
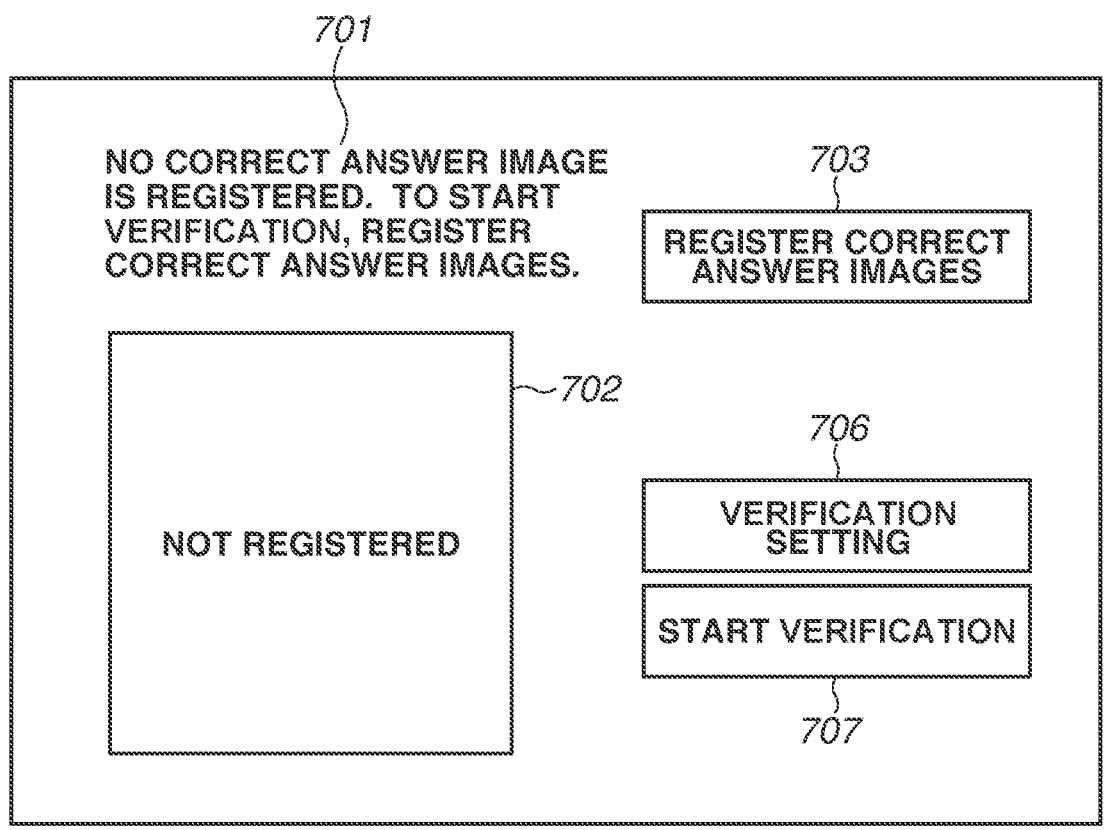
FIG. 7 illustrates an example of a display screen before registration of correct answer images in the verification apparatus according to the first exemplary embodiment.

FIG. 7 illustrates an example of the screen displayed on the display unit 241 of the verification apparatus 109 when the verification apparatus 109 is activated. A display section 701 displays a message that no correct answer image is registered, and correct answer images are to be registered to start verification. If correct answer images have been registered, the display section 701 displays a message that verification can be started. A display section 702 displays a registered correct answer image. In FIG. 7, the display section 702 displays the absence of registration, since no correct answer image is registered. The display section 702 may display information about a verification setting, such as a separator sheet setting, aside from correct answer images.

The button 703 is intended to call a correct answer image registration screen. Correct answer images are images to be compared with images read by the verification apparatus 109. Images obtained by reading printed sheets determined to be normal in advance by visual observation or by the verification apparatus 109 are used as the correct answer images. A button 706 is intended to call a verification setting screen. Verification items and verification precision (the degree of difference from the correct answer images beyond which read images are determined to be defective images) are set according to the user's verification purpose. A button 707 is intended to give an instruction to start verification. If verification is started, the verification apparatus 109 starts verifying images of conveyed sheets (sheet images).

FIG. 8 illustrates an example of the screen displayed on the display unit 241 of the verification apparatus 109 in registering correct answer images. The display screen of FIG. 8 is displayed when the button 703 of FIG. 7 is selected. A setting section 801 is intended to set the number of sheets per copy of the print job to be verified. If the number of sheets per copy of the print job to be verified is two or more, the verification apparatus 109 can register a plurality of images as correct answer images on each side.

A setting section 802 is intended to set the side(s) to be verified. Whether the verification apparatus 109 verifies both sides, or only the front or the back, can be set. Even if a sheet is printed only on one side, both sides can be set to be verified to see the absence of dust on the unprinted side. A setting section 803 can set how many sheet images are obtained to generate an averaged correct answer image. A button 804 is intended to give an instruction to register correct answer images. After the button 804 is pressed, the verification apparatus 109 reads images of conveyed sheets on which the correct answer images are printed, and registers the read images or averaged images as correct answer images. Here, the client PC 103 may transmit the correct answer image data to the external controller 102 and correct answer images printed by the printer 107 may be read by the verification apparatus 109. Sheets on which the correct answer images are printed may be inserted from the inserter 108 and read by the verification apparatus 109.

Figure 9:
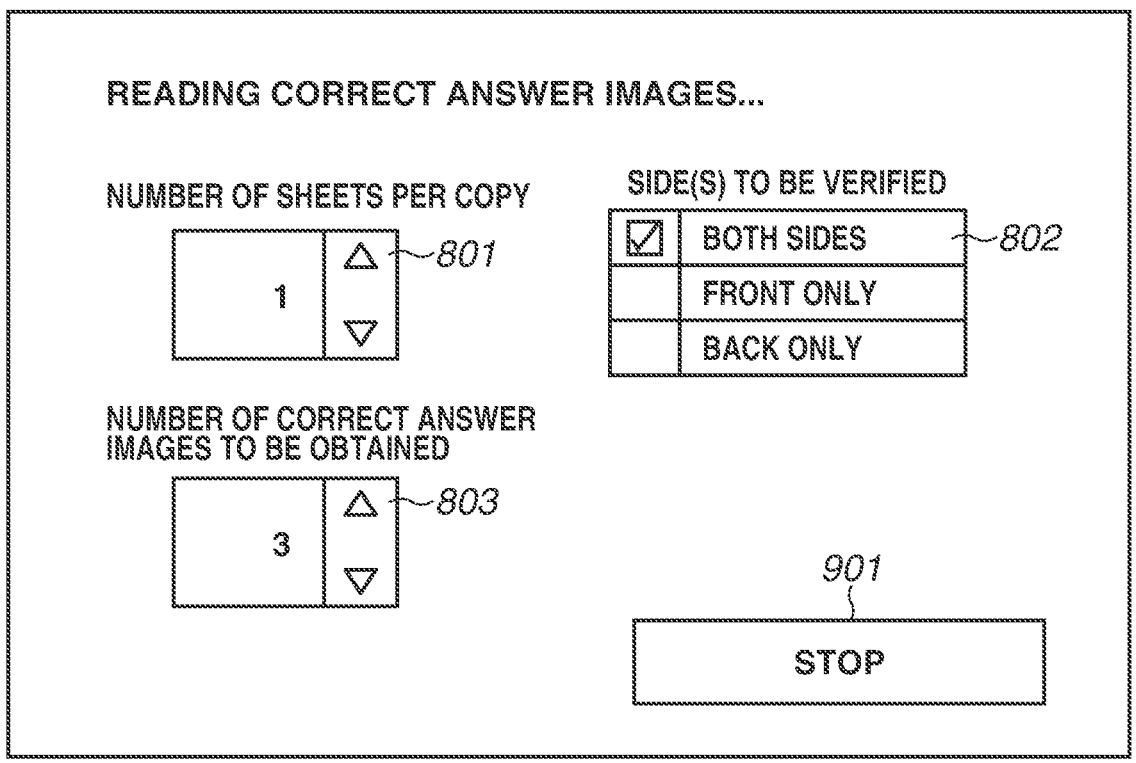
FIG. 9 illustrates an example of a display screen when the verification apparatus is reading correct answer images according to the first exemplary embodiment.

FIG. 9 illustrates an example of the screen displayed on the display unit 241 of the verification apparatus 109 during reading of correct answer images. The screen illustrated in FIG. 9 is displayed when the button 804 of FIG. 8 is pressed. This screen is displayed until as many sheets as set in the setting sections 801 and 803 are read. A button 901 is intended to give an instruction to stop the reading of the correct answer images. If the button 901 is pressed, the display screen returns to that of FIG. 7 without registering a correct answer image.

Figure 10:
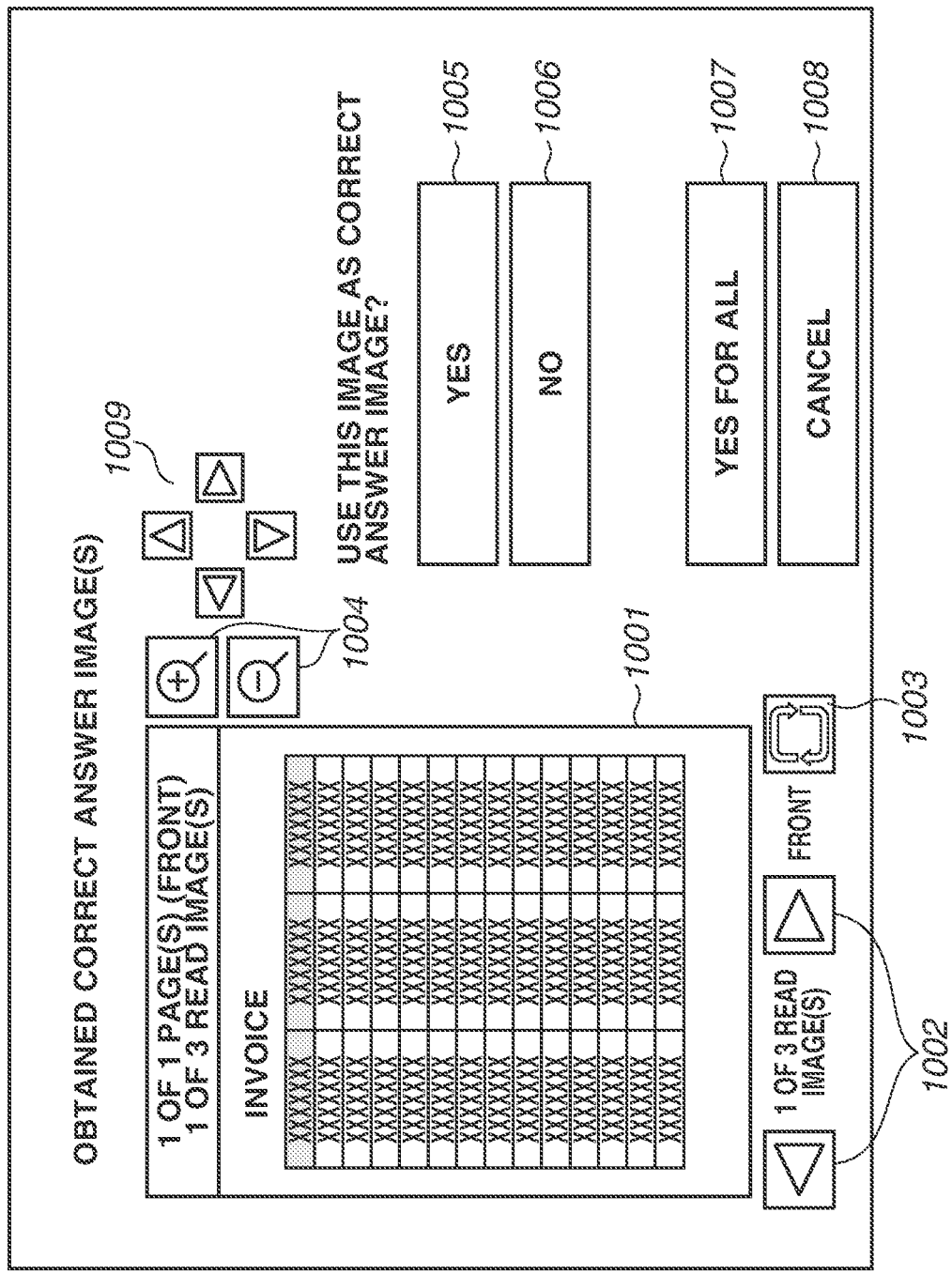
FIG. 10 illustrates an example of a display screen after the reading of the correct answer images by the verification apparatus according to the first exemplary embodiment.

FIG. 10 illustrates an example of the screen displayed on the display unit 241 of the verification apparatus 109 after the reading of the correct answer images is completed. A display section 1001 displays a preview image of a printed sheet read by the verification apparatus 109. If there is a plurality of preview images, the displayed image is switched by using switch buttons 1002. If both front and back sides are verified, the sides can be switched by using a switch button 1003. To check the read image for dust and streaks, image zoom in/out buttons 1004 are used to observe the entire image and details for dust and streaks. After the image is enlarged, the display area can be moved by operating move image buttons 1009. The operation buttons 1002, 1003, 1004, and 1009 are just examples, and such operations may be assigned to gesture operations like a flick, pinch, and swipe, without displaying the operation buttons 1002, 1003, 1004, and 1009.

A button 1005 is intended to give an instruction to use the currently displayed image as a candidate image of a correct answer image after the read image in the display section 1001 is observed. A correct answer image is generated by calculating averages of the pixel values of pixels located at corresponding positions in a plurality of obtained images that are selected to be used by pressing the button 1005. A button 1006 is intended to give an instruction not to use the currently displayed image as a candidate image of a correct answer image, i.e., not to use the currently displayed image in the averaging processing. An obtained image for which the button 1006 is pressed is simply discarded and not used to generate a correct answer image. If only one image is selected to be used as a correct answer image, the selected image is registered as a correct answer image. If a plurality of images is selected to be used as a correct answer image, a main image may be selected from the plurality of selected images, and the processing for generating a correct answer image may be performed with a higher weight on the selected main image.

A button 1007 is intended to give an instruction to simultaneously use all the obtained images as a correct answer image. A button 1008 is intended to give an instruction to discard all the obtained images and not to use any of the obtained images to generate a correct answer image. If the button 1007 is pressed or if the button 1005 or 1006 has been selected for each of the obtained images, the display screen proceeds to that of FIG. 11A.

Figure 11A:
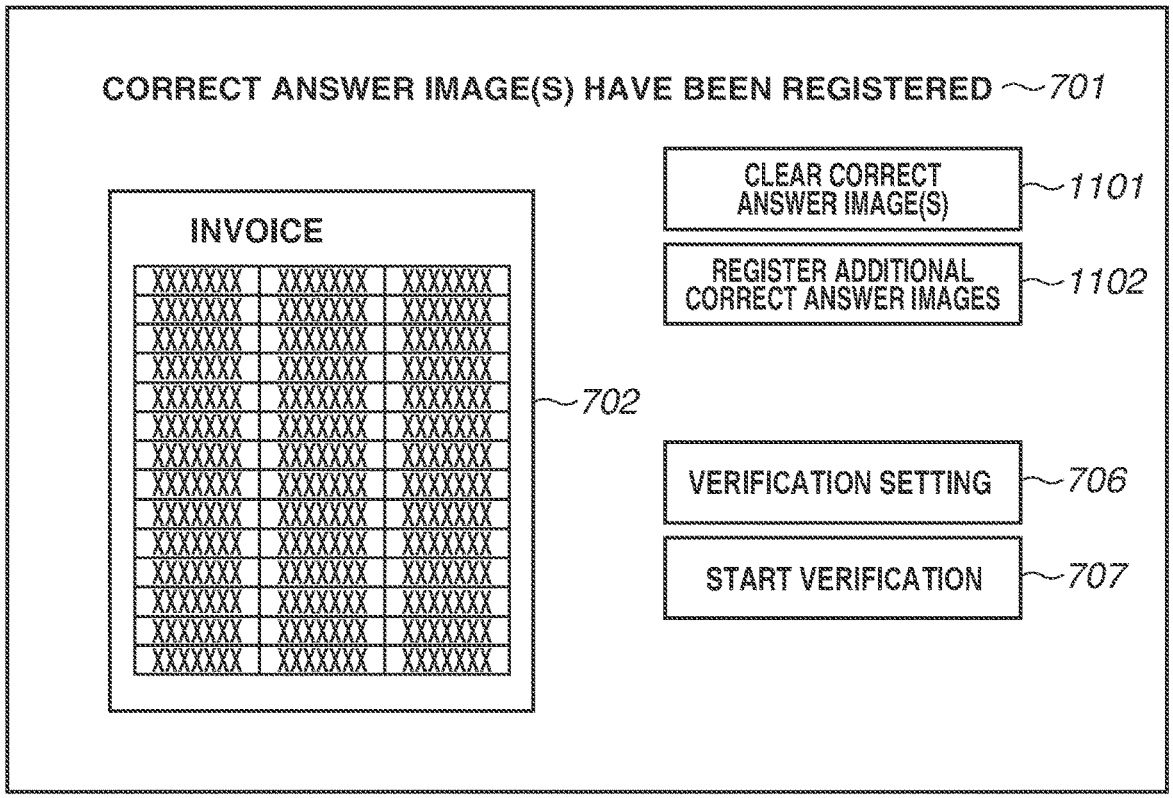
FIG. 11A illustrates an example of a display screen after the registration of correct answer images in the verification apparatus according to the first exemplary embodiment.

FIG. 11A illustrates an example of the screen displayed after registration of a correct answer image or images. Unlike the display screen of FIG. 7 before the registration of the correct answer image(s), the display section 701 displays a message that the correct answer image(s) have been registered. The display section 702 displays a registered correct answer image. The correct answer image displayed here is generated by averaging the pixel values of pixels located at corresponding positions in a plurality of sheet images read by the CISs 331 and 332.

A button 1101 is intended to clear the registered correct answer image(s). If the correct answer image(s) is/are cleared, the display screen returns to that of FIG. 7. A button 1102 is intended to register additional correct answer images. Suppose that some of the obtained images are discarded on the screen of FIG. 10 and the user wants to obtain additional correct answer image candidates. In such a case, additional correct answer image candidates can be obtained by pressing the button 1102. If the button 1102 is pressed, the display screen proceeds to that of FIG. 11B.

Figure 11B:
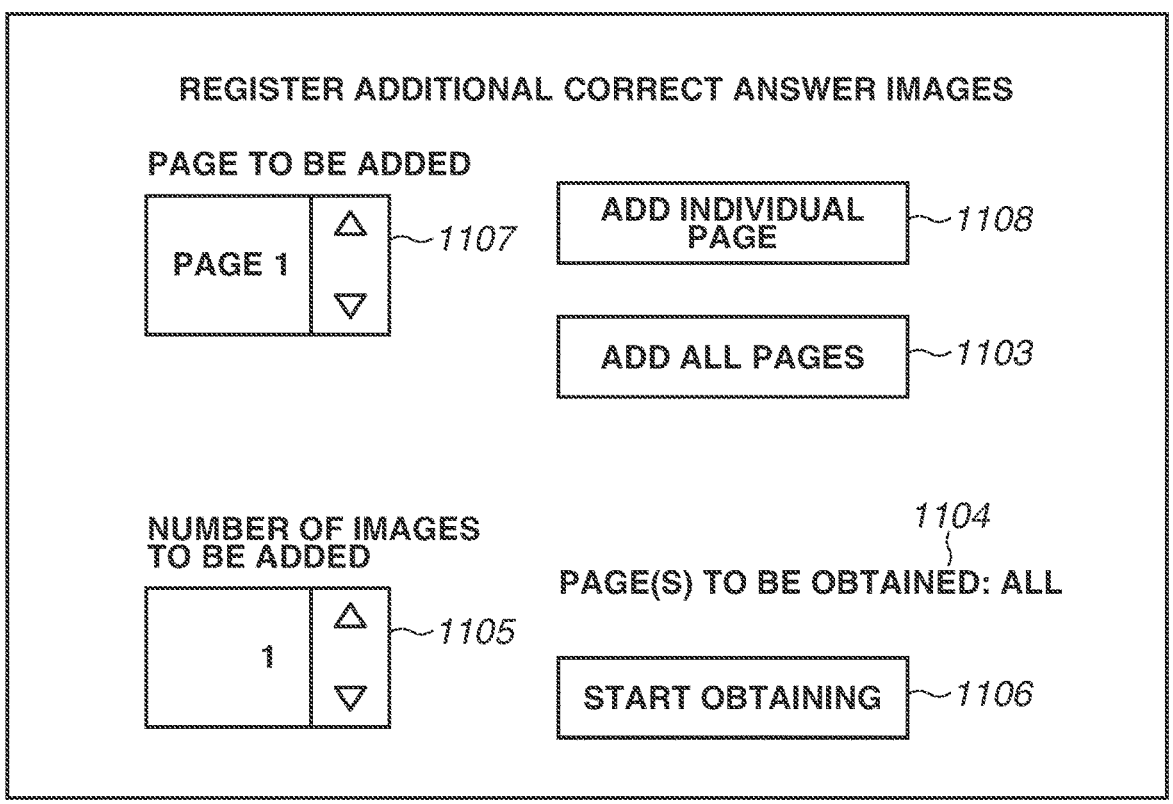
FIG. 11B illustrates an example of a display screen after the registration of correct answer images in the verification apparatus according to the first exemplary embodiment.

FIG. 11B illustrates an example of a screen for making settings about the registration of additional correct answer images. An additional page specification section 1107 is a section for specifying an additional page to be obtained. An individual page addition button 1108 is a button for giving an instruction to obtain an additional page specified in the additional page specification section 1107. An all page simultaneous addition button 1103 is a button for giving an instruction to simultaneously additionally obtain all the pages. A display section 1104 displays the page(s) to be additionally obtained, specified by using the button 1108 or 1103. An additional image number specification section 1105 is a section for specifying how many images are obtained for each page specified to be additionally obtained. A start obtaining button 1106 is a button for starting to obtain additional images. If the start obtaining button 1106 is pressed and the specified number of images has been obtained, the display screen proceeds to that of FIG. 10.

Figure 12:
FIG. 12 illustrates an example of a display screen when the verification apparatus makes verification settings according to the first exemplary embodiment.

FIG. 12 illustrates an example of the screen displayed on the display unit 241 of the verification apparatus 109 in making verification settings. The display screen of FIG. 12 is displayed when the button 706 of FIG. 7 is pressed. The setting section 1201 is intended to set a verification level. The verification precision can be changed by the setting in the setting section 1201. The higher the verification level, the smaller the difference between a correct answer image and a read image beyond which the verification apparatus 109 determines the read image to be a defective image.

The setting section 1202 is intended to set a verification type. Verification items can be set according to the user's verification purpose. FIG. 12 illustrates that the position, color, streaks, and omission are the items to be verified, and the density is not. The verification type according to the present exemplary embodiment is just an example.

FIG. 13 illustrates an example of the screen displayed on the display unit 241 of the verification apparatus 109 after a start of verification. The display screen of FIG. 13 is displayed when the button 707 of FIG. 7 is pressed. The display section 1301 displays the image of the printed sheet last read by the verification apparatus 109. A display section 1302 displays the determination result obtained by comparing the read image in the display section 1301 with its correct answer image. In the example of FIG. 13, the display section 1302 displays "passed" because the read image is determined to be a normal image. The verification end button 1303 is a button for giving an instruction to end the verification. If the verification end button 1303 is pressed, the verification apparatus 109 ends the verification processing, and the display screen returns to that of FIG. 7.

FIG. 14 illustrates an example of a screen when the last read image is determined to be a defective image. Since the read image displayed in the display section 1301 is compared with the correct answer image and determined to be a defective image, the display section 1302 displays "failed", as well as the factor from which the read image is determined to be failure and the position thereof. FIG. 14 illustrates that the read image is determined to be a defective image because a streak 1405 is detected.

Figure 15:
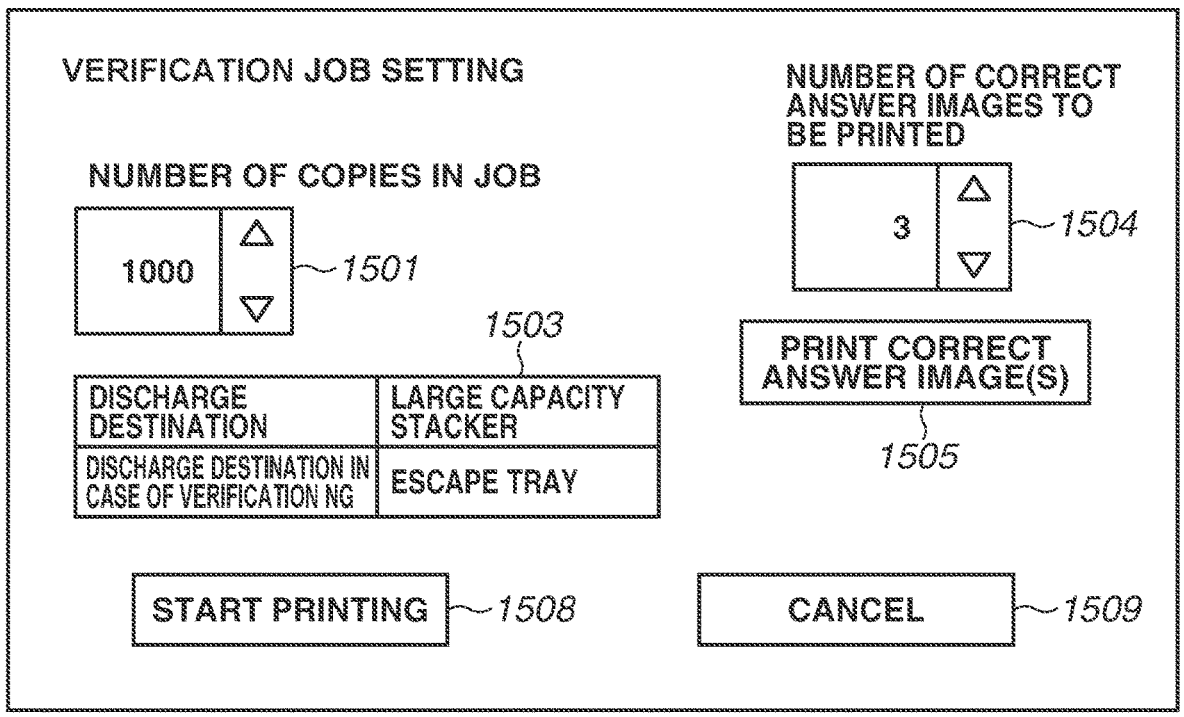
FIG. 15 illustrates an example of a display screen when the external controller makes verification job settings according to the first exemplary embodiment.

FIG. 15 illustrates an example of a verification job setting screen displayed on the display 212 of the external controller 102. While FIGS. 7 to 14 illustrate examples of the screens in making verification settings on the verification apparatus 109, instructions to transmit printed sheets of correct answer images and printed sheets to be verified to the verification apparatus 109 are issued from the external controller 102. Such verification job settings may be made from the display unit 241 of the verification apparatus 109 instead.

A setting section 1501 is intended to set the number of copies in a job. In FIG. 15, the job is set to be printed in 1000 copies. In the example of FIG. 15, a single copy includes one page, and a single job includes 1000 pages. In another example, a single copy may include a plurality of pages. The setting section 1503 is intended to set the discharge destination of the job for verification (hereinafter, referred to as a verification job). Here, the large capacity stacker 110 is set as the discharge destination, and the escape tray 346 is set as the discharge destination in a case where the read image is determined to be a defective image by the verification (verification failure). Aside from such settings, the same tray may be set as the discharge destinations in the cases of both verification success and verification failure. In such a case, printed sheets of verification failure are manually removed afterward based on a not-illustrated list of verification results. Alternatively, if all sheets are discharged to the same tray, printed sheets of verification success and printed sheets of verification failure may be discharged to different positions, and the printed sheets of verification failure may be removed afterward.

A display section 1504 and a button 1505 are intended to give an instruction to print N copies of the verification job. If the user instructs the verification apparatus 109 to start registering correct answer images from the button 804 of FIG. 8 and then gives an instruction to print N copies of the verification job using the display section 1504 and the button 1505 of the external controller 102, the printer 107 performs print processing and the verification apparatus 109 reads the correct answer images. Alternatively, the verification apparatus 109 may be configured to automatically issue an instruction to print N copies of the verification job to the external controller 102 via the communication cable 254 and the internal LAN 105 at the same time as when the button of the setting section 803 of FIG. 8 is pressed. Similarly, the verification apparatus 109 may be configured to issue an instruction to additionally print a specific page or pages to the external controller 102 at the same time as when the button 1106 is pressed in obtaining additional correct answer images as described with reference to FIGS. 11A and 11B.

A button 1508 is intended to give an instruction to start printing the verification job. If the instruction to start printing is given by selection of the button 1508, the external controller 102 submits the verification job to the printer 107 based on the settings of FIG. 15. The user instructs the verification apparatus 109 to start verification by selecting the button 707 of FIG. 7, and then instructs the external controller 102 to start printing the verification job by using the button 1508. The external controller 102 thus submits print data to the printer 107, and instructs the printer 107 to convey printed sheets to the verification apparatus 109. The verification apparatus 109 reads images of the printed sheets conveyed thereto, and performs the verification processing. Alternatively, the external controller 102 may be configured to instruct the verification apparatus 109 to start verification when the external controller 102 is instructed to start printing the verification job by the pressing of the button 1508. In such a case, the verification apparatus 109 may be configured to notify the external controller 102 whether correct answer images are registered, so that the external controller 102 does not start printing if no correct answer image is registered.

As described above, according to the present exemplary embodiment, images read by the CISs 331 and 332 during registration of correct answer images can be previewed on the UI screen. This enables the user to determine whether to use the printed correct answer images as correct answer image candidates not only by visually observation of the printed sheets but also by checking whether the correct answer images are correctly read by the CISs 331 and 332.

Second Exemplary Embodiment

The first exemplary embodiment can provide a preview display on the UI screen in registering correct answer images, and the user can check by himself/herself whether the correct answer images are correctly read. However, previewing and checking all the correct answer images for reading failures due to streaks caused by paper dust is troublesome to the user.

In the present exemplary embodiment, the occurrence of a reading failure is detected by image processing during reading of the correct answer images by the CISs 331 and 332. Correct answer images from which a reading failure is detected are automatically excluded from a preview display. An apparatus for facilitating registration of correct answer images by the user can thus be constructed.

Details of an exemplary embodiment of such an apparatus will be described below. A description of configurations and processes similar to those of the first exemplary embodiment will be omitted, and only those unique to the present exemplary embodiment will be described.

Figure 16:
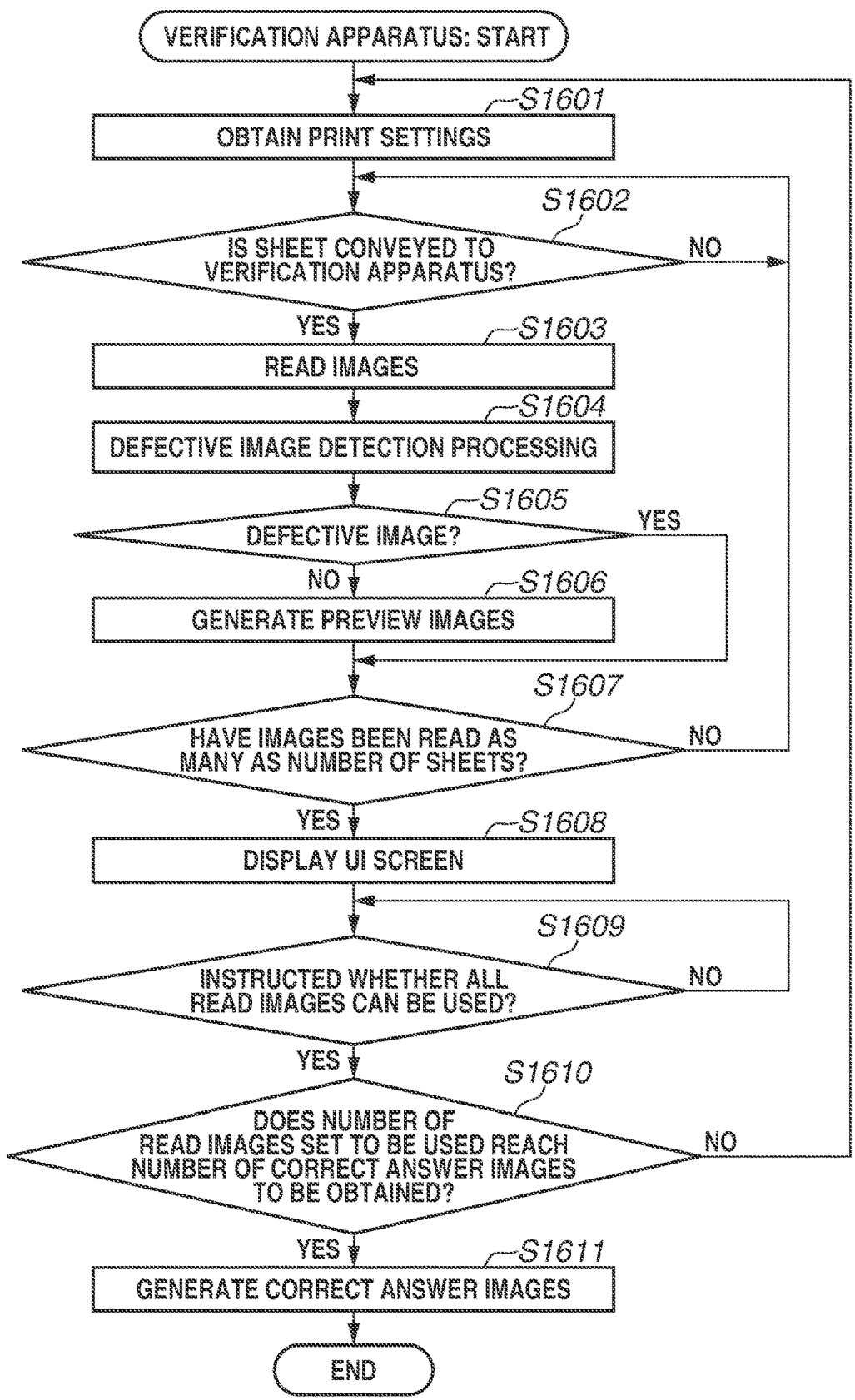
FIG. 16 is a flowchart illustrating a procedure performed by a verification apparatus in performing verification processing according to a second exemplary embodiment.

In the present exemplary embodiment, the procedure of the verification apparatus 109 in registering correct answer images is different from that of FIG. 6 described in the first exemplary embodiment. FIG. 16 illustrates the procedure of the verification apparatus 109 in registering correct answer images according to the present exemplary embodiment. FIG. 16 is a flowchart illustrating the procedure performed by the verification apparatus 109 in performing verification processing. A program for performing the flowchart of FIG. 16 is stored in the memory 239 and executed by the CPU 238 of the verification apparatus 109.

In step S1601, the verification apparatus 109 obtains print settings. As illustrated in FIG. 17, the print settings obtained in step S1601 include the number of sheets per copy, the side(s) to be verified, and the number of images per sheet to be averaged to generate a correct answer image. Whether to automatically exclude a read image including a streak from the registration of correct answer images can also be set. When fed back from step S1610 to be described below, the number of sheets to be printed is determined based on the number of read images already set to be used in step S1610. The number of sheets to be printed is the same as the number of registered correct answer images that lack. In the following description, suppose that there is a setting to automatically exclude read images including a streak from registration candidates of correct answer images. Without the setting to exclude, the second exemplary embodiment is similar to the first exemplary embodiment.

Figure 20A:
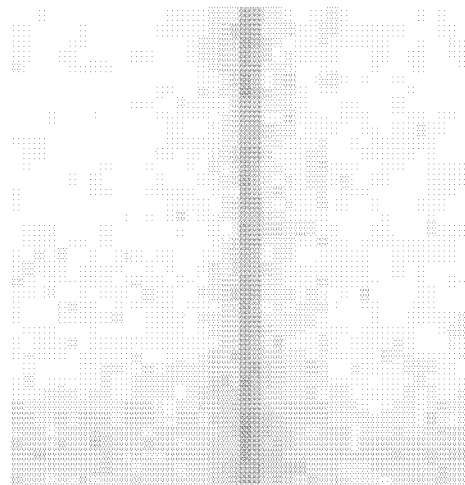
FIG. 20A illustrates an example of stray streak pixels according to the second exemplary embodiment.
Figure 20B:
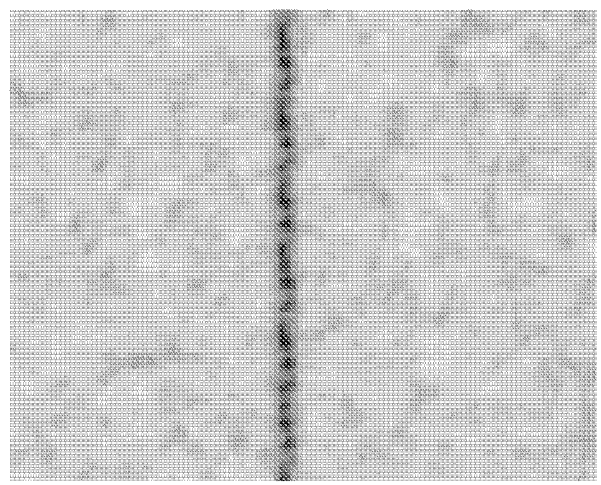
FIG. 20B illustrates an example of vertical line pixels in a document according to the second exemplary embodiment.

In step S1602, the verification apparatus 109 waits until a sheet is conveyed to the verification apparatus 109. If a sheet is conveyed in step S1602 (YES in step S1602), the processing proceeds to step S1603. In step S1603, the verification apparatus 109 reads the images on the sheet by using the CISs 331 and 332, and stores the read images in the memory 239 of the verification apparatus 109. In step S1604, the verification apparatus 109 applies defective image detection processing to the read images stored in the memory 239 to generate defect information. Examples of defects to be detected by the defective image detection processing include a stray streak and a fixed streak due to paper dust. FIG. 20A illustrates an example of an image including a stray streak. FIG. 20B illustrates a vertical line in a document. Conventional techniques can be used as an algorithm for detecting a stray streak. For example, filtering processing is applied to the read image to detect vertical lines with expected streak widths. Next, the amounts of change in the brightness values of the detected vertical lines from nearby pixels in the main scanning direction and the amounts of change in the brightness values of the detected vertical lines from nearby pixels in the sub scanning direction are calculated. Whether a pixel belongs to a streak can be determined from the calculations and continuity to the sub scanning direction.

FIG. 18 illustrates a table for managing the defect information. The defect information includes a flag managed for each read image. The flag is set to 1 if the image includes a streak occurring from paper powder during reading. However, this is just an example. A flag may be provided for each piece of image information by utilizing a header area of the image information.

Return to the description of FIG. 16. In step S1605, the verification apparatus 109 obtains the defect information about the read images, and determines whether the read images are defective images. If at least either one of the read images is a defective image (YES in step S1605), the processing proceeds to step S1607. If the read images are not defective images (NO in step S1605), the processing proceeds to step S1606. In step S1606, the verification apparatus 109 generates preview images for previewing the images read in step S1603 on the display unit 241 of the verification apparatus 109. In step S1607, the verification apparatus 109 determines whether images have been read as many as the number of sheets obtained in step S1601. If, in step S1607, images have not been read as many as the number of sheets yet (NO in step S1607), the processing proceeds to step S1602.

In step S1608, the verification apparatus 109 generates an UI screen including a preview image generated in step S1606, and displays the UI screen on the display unit 241. Details of the UI screen displayed here will be described below with reference to FIG. 19. In step S1609, the verification apparatus 109 determines whether the verification apparatus 109 is instructed from the UI screen whether all the read images can be used as correct answer images. If the verification apparatus 109 is instructed whether all the read images can be used (YES in step S1609), the processing proceeds to step S1610. If not (NO in step S1609), the processing proceeds to step S1609.

In step S1610, the verification apparatus 109 determines whether the number of read images set to be used on the UI screen reaches the number of correct answer images to be obtained. If the number of read images set to be used reaches the number of correct answer images to be obtained (YES in step S1610), the processing proceeds to step S1611. In step S1611, the verification apparatus 109 generates correct answer images by averaging the read images. The processing ends. If, in step S1610, the number of read images set to be used does not reach the number of correct answer images to be obtained (NO in step S1610), the processing proceeds to step S1601. While the processing is described to proceed to the procedure for printing as many additional images as lacking based on the determination in step S1610, the procedure may be modified so that lacking images are additionally printed immediately after a read image is determined to be a defective image in step S1605. Moreover, print products determined to be defective by the defective image detection processing may be controlled to be output to a different discharge tray from print products determined to be normal. This enhances the correlation with preview images to be described below that are displayed to specify whether the read images can be used, and enables more intuitive understanding.

Figure 19:
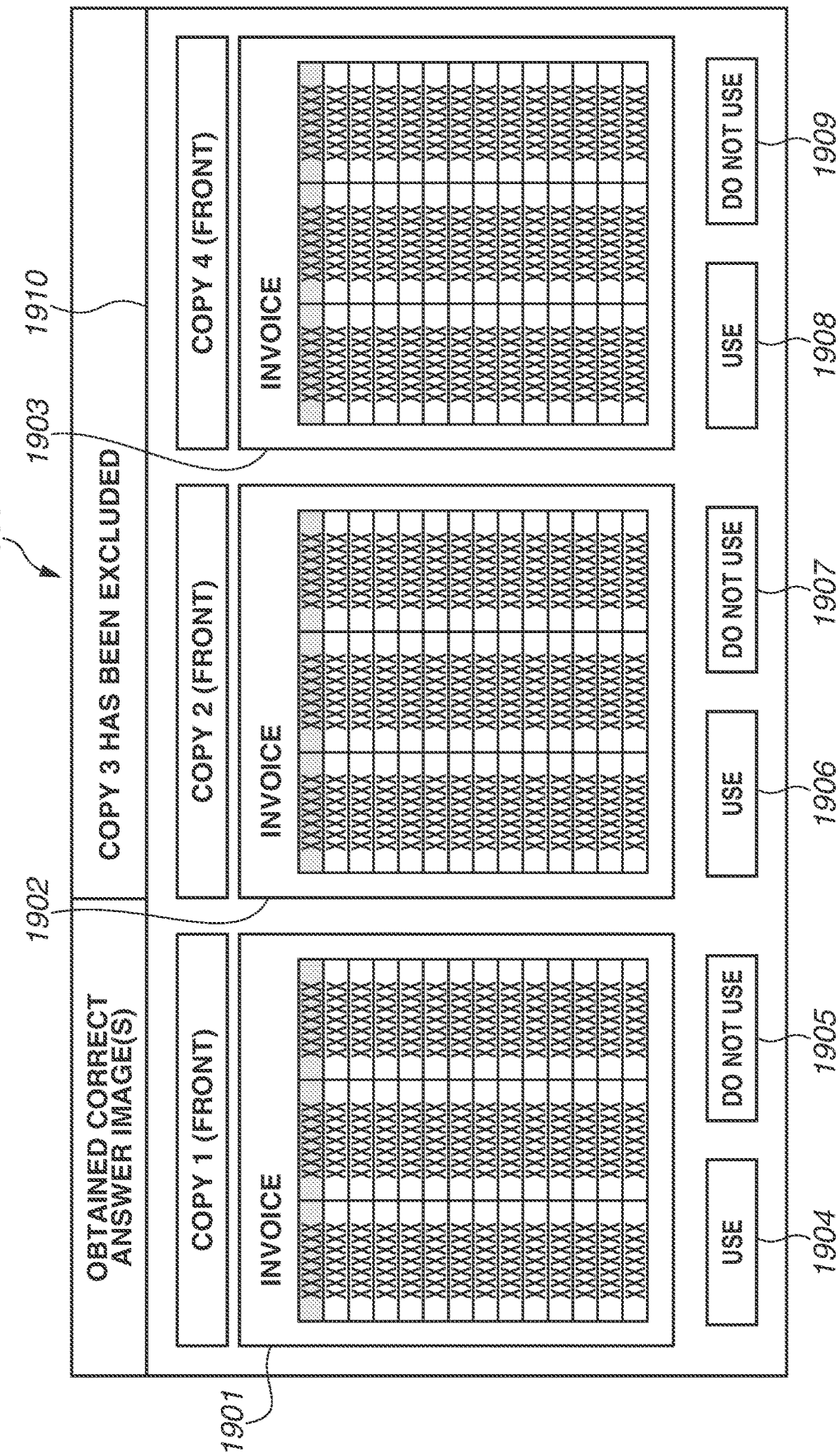
FIG. 19 illustrates an example of a display screen after reading of correct answer images by the verification apparatus according to the second exemplary embodiment.

FIG. 19 illustrates an example of a screen displayed on the display unit 241 of the verification apparatus 109 after the completion of reading of correct answer images. A display section 1900 displays preview images of printed sheets read by the verification apparatus 109. The images displayed here are different from ones displayed in the first exemplary embodiment in that images determined to be defective images by the defective image detection processing are excluded. Here, the display section 1900 displays preview images 1901, 1902, and 1903. While the display section 1900 is configured to be able to simultaneously display three preview images as an example, this is not restrictive. The preview image 1901 is that of the first copy of the print product. The preview image 1902 is that of the second copy of the print product. The preview image 1903 is that of the fourth copy of the print product. In this example, the third copy of the print product is determined to include a defective image due to the occurrence of a stray streak during reading. An information display section 1910 displays information about the read image automatically excluded from the correct answer image candidates by the defective image detection processing.

Instruction buttons 1904 to 1909 are intended for the user to, after checking the preview images in the display section 1900, specify whether to use the read images corresponding to the currently displayed preview images as correct answer image candidates. The instruction buttons 1904 and 1905 are intended to specify whether to use the read image corresponding to the preview image 1901 as a correct answer image candidate. The instruction buttons 1906 and 1907 are similar buttons for the preview image 1902, and the instruction buttons 1908 and 1909 are similar buttons for the preview image 1903. If the instruction buttons (to-use buttons) 1904, 1906, and/or 1908 are pressed, the corresponding read images are averaged to generate a correct answer image. If the instruction buttons (not-to-use buttons) 1905, 1907, and/or 1909 are pressed, the corresponding read images are simply discarded and not used as a correct answer image. If neither of the to-use and not-to-use buttons on a read image is pressed, the read image is handled based on a default setting (for example, to be used) in generating a correct answer image.

If the usage of all the displayable preview images is specified, the display screen proceeds to that of FIG. 11A. While FIG. 19 illustrates the read correct answer image candidates one by one, an averaged correct answer image may be displayed for observation. Both the correct answer image candidates and the averaged correct answer image may be displayed for observation.

As described above, according to the present exemplary embodiment, the defective image detection processing is performed on the images read by the CISs 331 and 332 during registration of correct answer images, and defective images occurring during reading can be excluded from preview images. This can reduce the user's time and effort for observation.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An inspection apparatus inspecting image read from image formed on a recording sheet by using reference image comprising:
   one or more controllers including one or more processors and one or more memories, the one or more controllers configured to:
   cause a display to display a plurality of images read from images formed on the plurality of recording sheets;
   accept one or more images to be used as a reference image among the plurality of displayed images; and
   use the accepted one or more images as the reference image to inspect target image,
   wherein if the accepted one or more images are a plurality of images, an image is selected among the accepted the plurality of images, and the reference image is generated by using the selected image and an image not selected among the accepted the plurality of images, and
   wherein the reference image is generated with a higher weight on the selected image than the not selected image.

2. The inspection apparatus according to claim 1, wherein if the accepted one or more images are an image, the accepted image is used as the reference image.

3. The inspection apparatus according to claim 2, the reference image is generated by calculating values of pixels located at corresponding position in the accepted one or more images.

4. The inspection apparatus according to claim 1, wherein a reader reads an image formed on the recording sheet and the read image is inspected as the target image.

5. The inspection apparatus according to claim 4, wherein the reader is a contact image sensor (CIS).

6. The inspection apparatus according to claim 1, the one or more controllers further configured to accept one or more images not to be used as the reference image among the plurality of displayed images.

7. An inspection method for inspecting image read from image formed on a recording sheet by using reference image comprising:
   displaying, on a display, a plurality of images read from images formed on the plurality of recording sheets;
   accepting one or more images to be used as a reference image among the plurality of displayed images; and
   using the accepted one or more images as the reference image to inspect target image,
   wherein if the accepted one or more images are a plurality of images, an image is selected among the accepted the plurality of images, and the reference image is generated by using the selected image and an image not selected among the accepted the plurality of images, and
   wherein the reference image is generated with a higher weight on the selected image than the not selected image.

8. The inspection method according to claim 7, wherein if the accepted one or more images are an image, the accepted image is used as the reference image.

9. The inspection method according to claim 7, the reference image is generated by calculating values of pixels located at corresponding position in the accepted one or more images.

10. An inspection system comprising:
    a printer which forms an image on a recording sheet;
    a reader which reads the image formed on the recording sheet;
    one or more controllers including one or more processors and one or more memories, the one or more controllers configured to:
    cause the reader to read a plurality of images formed on a plurality of recording sheets;
    cause a display to display the plurality of the images read by the reader;
    accept one or more images to be used as a reference image among the plurality of displayed images; and
    inspect a target image read from an image formed on a recording sheet using the accepted one or more images as the reference image,
    wherein if the accepted one or more images are a plurality of images, an image is selected among the accepted the plurality of images, and the reference image is generated by using the selected image and an image not selected among the accepted the plurality of images, and
    wherein the reference image is generated with a higher weight on the selected image than the not selected image.

* * * * *